(12) United States Patent
Jen et al.

(10) Patent No.: US 11,789,892 B2
(45) Date of Patent: *Oct. 17, 2023

(54) RECALIBRATION OF PHY CIRCUITRY FOR THE PCI EXPRESS (PIPE) INTERFACE BASED ON USING A MESSAGE BUS INTERFACE

(71) Applicant: Intel Corporation, Santa Clara, CA (US)

(72) Inventors: Michelle C. Jen, Mountain View, CA (US); Minxi Gao, Chandler, AZ (US); Debendra Das Sharma, Saratoga, CA (US); Fulvio Spagna, San Jose, CA (US); Bruce A. Tennant, Hillsboro, OR (US); Noam Dolev Geldbard, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/738,625

(22) Filed: May 6, 2022

(65) Prior Publication Data
US 2022/0269641 A1     Aug. 25, 2022

Related U.S. Application Data

(63) Continuation of application No. 16/926,524, filed on Jul. 10, 2020, now Pat. No. 11,327,920, which is a
(Continued)

(51) Int. Cl.
*G06F 13/42*     (2006.01)

(52) U.S. Cl.
CPC .. *G06F 13/4282* (2013.01); *G06F 2213/0026* (2013.01)

(58) Field of Classification Search
CPC .............. G06F 13/4282; G06F 2213/0026
See application file for complete search history.

(56) References Cited

U.S. PATENT DOCUMENTS 9,344,961 B2   5/2016   Ling et al.
9,355,058 B2   5/2016   Iyer et al.
(Continued)

OTHER PUBLICATIONS

EPO; Extended European Search Report for EP Application No. 20150663.1, dated May 12, 2020, 12 pages.
(Continued)

*Primary Examiner* — Tammara R Peyton
(74) *Attorney, Agent, or Firm* — Alliance IP, LLC

(57) ABSTRACT

An interface couples a controller to a physical layer (PHY) block, where the interface includes a set of data pins comprising transmit data pins to send data to the PHY block and receive data pins to receive data from the PHY block. The interface further includes a particular set of pins to implement a message bus interface, where the controller is to send a write command to the PHY block over the message bus interface to write a value to at least one particular bit of a PHY message bus register, bits of the PHY message bus register are mapped to a set of control and status signals, and the particular bit is mapped to a recalibration request signal to request that the PHY block perform a recalibration.

19 Claims, 14 Drawing Sheets

Related U.S. Application Data continuation of application No. 16/446,470, filed on Jun. 19, 2019, now Pat. No. 10,713,209.

(60) Provisional application No. 62/802,946, filed on Feb. 8, 2019.

(56) References Cited

U.S. PATENT DOCUMENTS

| | | | |
|---|---|---|---|
| 9,418,035 | B2 | 8/2016 | Iyer et al. |
| 9,596,676 | B2 * | 3/2017 | Gotman .............. H04B 17/14 |
| 10,062,453 | B1 | 8/2018 | Griffin |
| 10,374,609 | B1 | 8/2019 | Walstrom et al. |
| 10,713,209 | B2 | 7/2020 | Jen et al. |
| 2018/0181525 | A1 | 6/2018 | Iyer et al. |
| 2018/0285227 | A1 | 10/2018 | Sharma et al. |
| 2018/0350411 | A1 | 12/2018 | Ware et al. |

OTHER PUBLICATIONS

EPO; Extended European Search Report issued in EP Patent Application No. 20216102.2, dated Mar. 24, 2021; 17 pages.
EPO; Summons to Oral Proceedings issued in EP Patent Application No. 20150663.1, dated Jul. 28, 2021; 9 pages.
Morris, Jeff, et al., "PHY Interface for the PCI Express, SATA, USB 3.1, DisplayPort, and Converged IO Architectures: Version 5.1", Intel Corporation, 2018, 161 pages.

* cited by examiner

RECALIBRATION OF PHY CIRCUITRY FOR THE PCI EXPRESS (PIPE) INTERFACE BASED ON USING A MESSAGE BUS INTERFACE

This application is a continuation of (and claims the benefit of priority under 35 U.S.C. § 120) Ser. No. 16/926,524, filed Jul. 10, 2020, and entitled RECALIBRATION OF PHY CIRCUITRY FOR THE PCI EXPRESS (PIPE) INTERFACE BASED ON USING A MESSAGE BUS INTERFACE, which is a continuation of U.S. application Ser. No. 16/446,470, filed Jun. 19, 2019, which claims benefit to U.S. Provisional Patent Application Ser. No. 62/802,946, filed Feb. 8, 2019. The disclosures of the prior applications are considered part of and are hereby incorporated by reference in their entirety in the disclosure of this application.

FIELD

This disclosure pertains to computing system, and in particular (but not exclusively) to computer interfaces.

BACKGROUND

Advances in semi-conductor processing and logic design have permitted an increase in the amount of logic that may be present on integrated circuit devices. As a corollary, computer system configurations have evolved from a single or multiple integrated circuits in a system to multiple cores, multiple hardware threads, and multiple logical processors present on individual integrated circuits, as well as other interfaces integrated within such processors. A processor or integrated circuit typically comprises a single physical processor die, where the processor die may include any number of cores, hardware threads, logical processors, interfaces, memory, controller hubs, etc. As the processing power grows along with the number of devices in a computing system, the communication between sockets and other devices becomes more critical. Accordingly, interconnects, have grown from more traditional multi-drop buses that primarily handled electrical communications to full blown interconnect architectures that facilitate fast communication. Unfortunately, as the demand for future processors to consume at even higher-rates corresponding demand is placed on the capabilities of existing interconnect architectures. Interconnect architectures may be based on a variety of technologies, including Peripheral Component Interconnect Express (PCIe), Universal Serial Bus, and others.

DETAILED DESCRIPTION

Figure 1:
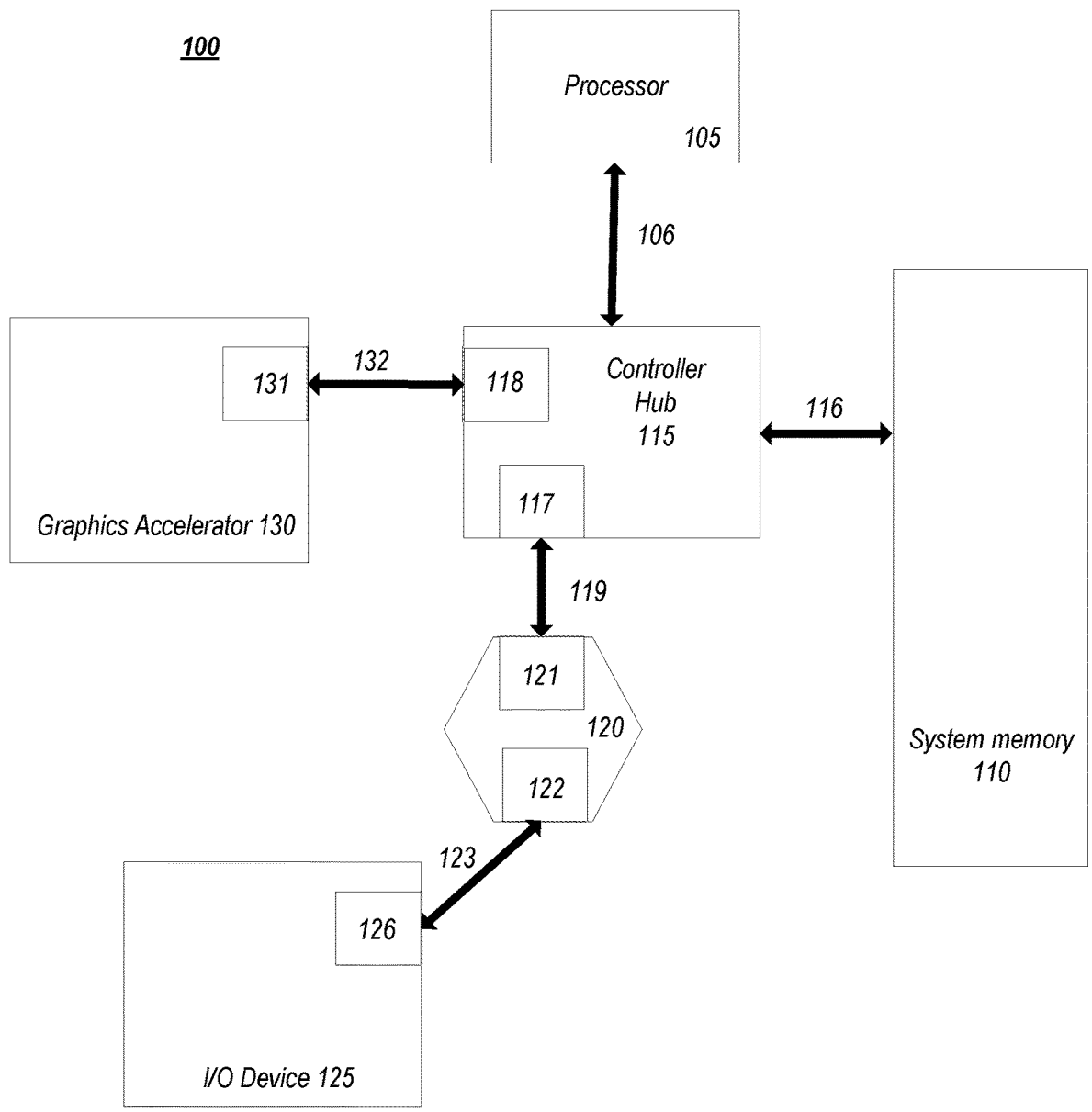
FIG. 1 illustrates an embodiment of a computing system including an interconnect architecture.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the invention described herein.

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/ Hot-Swap support, Data Integrity, and Error Handling are among some of the advanced features supported by PCI Express.

Referring to FIG. 1, an embodiment of a fabric composed of point-to-point Links that interconnect a set of components is illustrated. System 100 includes processor 105 and system memory 110 coupled to controller hub 115. Processor 105 includes any processing element, such as a microprocessor, a host processor, an embedded processor, a co-processor, or other processor. Processor 105 is coupled to controller hub 115 through front-side bus (FSB) 106. In one embodiment, FSB 106 is a serial point-to-point interconnect as described below. In another embodiment, link 106 includes a serial, differential interconnect architecture that is compliant with different interconnect standard.

System memory 110 includes any memory device, such as random access memory (RAM), non-volatile (NV) memory, or other memory accessible by devices in system 100. System memory 110 is coupled to controller hub 115 through memory interface 116. Examples of a memory interface include a double-data rate (DDR) memory interface, a dual-channel DDR memory interface, and a dynamic RAM (DRAM) memory interface.

In one embodiment, controller hub 115 is a root hub, root complex, or root controller in a Peripheral Component Interconnect Express (PCIe or PCIE) interconnection hierarchy. Examples of controller hub 115 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 105, while controller 115 is to communicate with I/O devices, in a similar manner as described below. In some embodiments, peer-to-peer routing is optionally supported through root complex 115.

Here, controller hub 115 is coupled to switch/bridge 120 through serial link 119. Input/output modules 117 and 121, which may also be referred to as interfaces/ports 117 and 121, include/implement a layered protocol stack to provide communication between controller hub 115 and switch 120. In one embodiment, multiple devices are capable of being coupled to switch 120.

Switch/bridge 120 routes packets/messages from device 125 upstream, i.e. up a hierarchy towards a root complex, to controller hub 115 and downstream, i.e. down a hierarchy away from a root controller, from processor 105 or system memory 110 to device 125. Switch 120, in one embodiment, is referred to as a logical assembly of multiple virtual PCI-to-PCI bridge devices. Device 125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 125 may include a PCIe to PCI/PCI-X bridge to support legacy or other version PCI devices. Endpoint devices in PCIe are often classified as legacy, PCIe, or root complex integrated endpoints.

Graphics accelerator 130 is also coupled to controller hub 115 through serial link 132. In one embodiment, graphics accelerator 130 is coupled to an MCH, which is coupled to an ICH. Switch 120, and accordingly I/O device 125, is then coupled to the ICH. I/O modules 131 and 118 are also to implement a layered protocol stack to communicate between graphics accelerator 130 and controller hub 115. Similar to the MCH discussion above, a graphics controller or the graphics accelerator 130 itself may be integrated in processor 105. It should be appreciated that one or more of the components (e.g., 105, 110, 115, 120, 125, 130) illustrated in FIG. 1 can be enhanced to execute, store, and/or embody logic to implement one or more of the features described herein.

Figure 2:
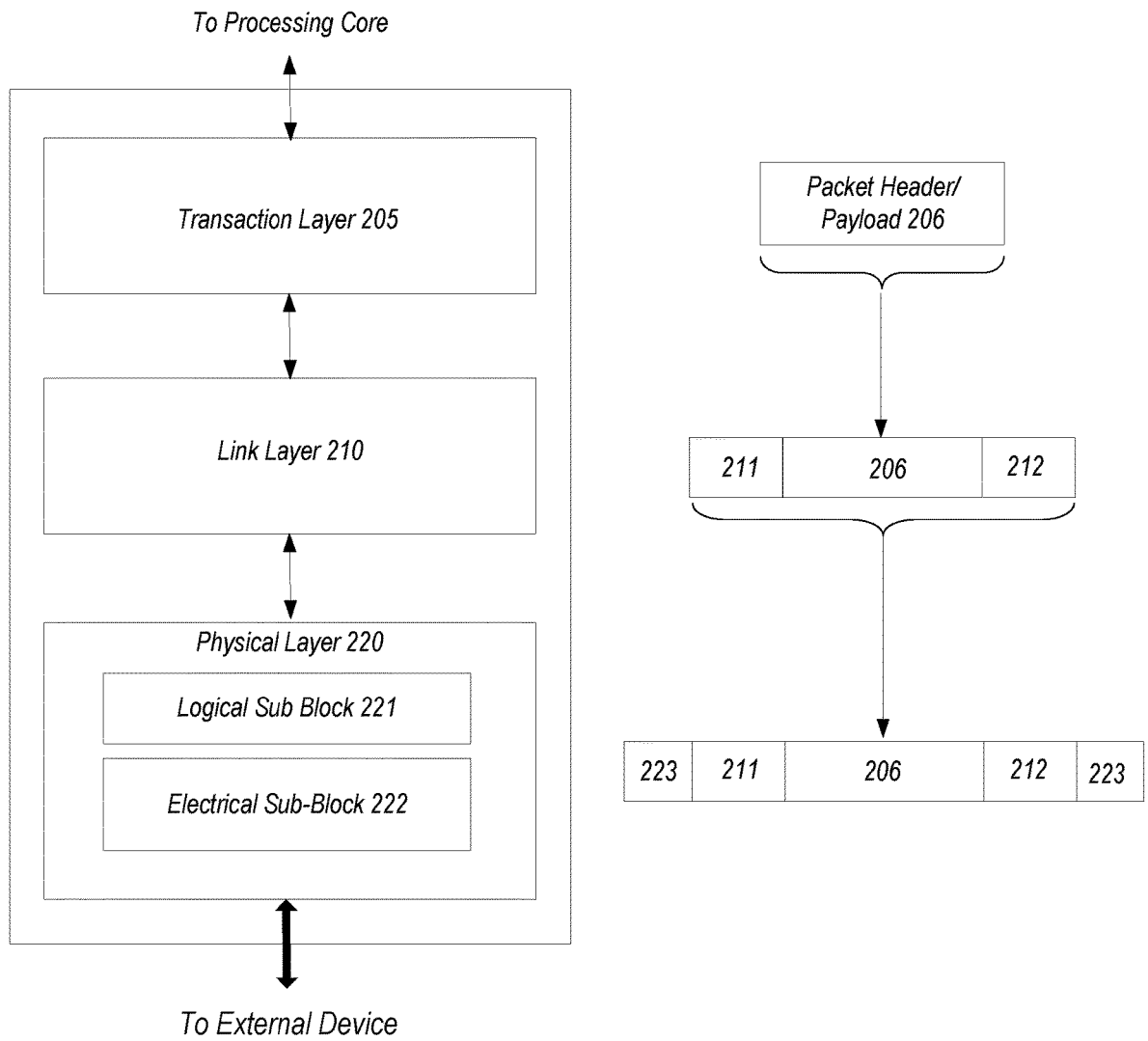
FIG. 2 illustrates an embodiment of a interconnect architecture including a layered stack.

Turning to FIG. 2 an embodiment of a layered protocol stack is illustrated. Layered protocol stack 200 includes any form of a layered communication stack, such as a Quick Path Interconnect (QPI) stack, a PCIe stack, a next generation high performance computing interconnect stack, or other layered stack. Although the discussion immediately below in reference to FIGS. 1-4 are in relation to a PCIe stack, the same concepts may be applied to other interconnect stacks. In one embodiment, protocol stack 200 is a PCIe protocol stack including transaction layer 205, link layer 210, and physical layer 220. An interface, such as interfaces 117, 118, 121, 122, 126, and 131 in FIG. 1, may be represented as communication protocol stack 200. Representation as a communication protocol stack may also be referred to as a module or interface implementing/including a protocol stack.

PCI Express uses packets to communicate information between components. Packets are formed in the Transaction Layer 205 and Data Link Layer 210 to carry the information from the transmitting component to the receiving component. As the transmitted packets flow through the other layers, they are extended with additional information necessary to handle packets at those layers. At the receiving side the reverse process occurs and packets get transformed from their Physical Layer 220 representation to the Data Link Layer 210 representation and finally (for Transaction Layer Packets) to the form that can be processed by the Transaction Layer 205 of the receiving device.

Transaction Layer

In one embodiment, transaction layer 205 is to provide an interface between a device's processing core and the interconnect architecture, such as data link layer 210 and physical layer 220. In this regard, a primary responsibility of the transaction layer 205 is the assembly and disassembly of packets (i.e., transaction layer packets, or TLPs). The translation layer 205 typically manages credit-based flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 205. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message transactions are defined to support in-band communication between PCIe agents.

Therefore, in one embodiment, transaction layer 205 assembles packet header/payload 156. Format for current packet headers/payloads may be found in the PCIe specification at the PCIe specification website.

Figure 3:
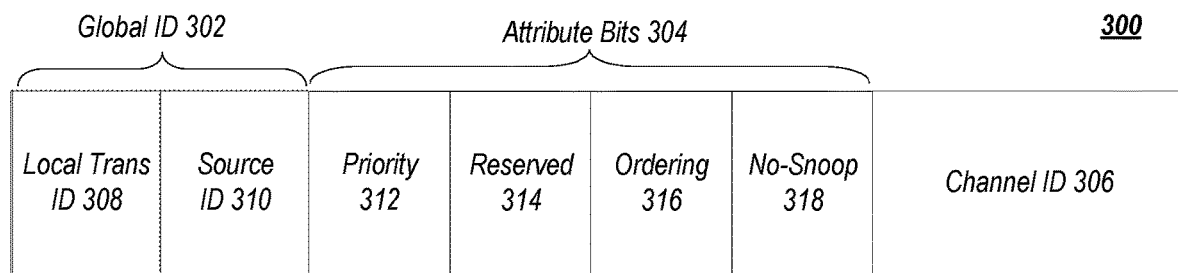
FIG. 3 illustrates an embodiment of a request or packet to be generated or received within an interconnect architecture.

Quickly referring to FIG. 3, an embodiment of a PCIe transaction descriptor is illustrated. In one embodiment, transaction descriptor 300 is a mechanism for carrying transaction information. In this regard, transaction descriptor 300 supports identification of transactions in a system. Other potential uses include tracking modifications of default transaction ordering and association of transaction with channels.

Transaction descriptor 300 includes global identifier field 302, attributes field 304 and channel identifier field 306. In the illustrated example, global identifier field 302 is depicted comprising local transaction identifier field 308 and source identifier field 310. In one embodiment, global transaction identifier 302 is unique for all outstanding requests.

According to one implementation, local transaction identifier field 308 is a field generated by a requesting agent, and it is unique for all outstanding requests that require a completion for that requesting agent. Furthermore, in this example, source identifier 310 uniquely identifies the requestor agent within a PCIe hierarchy. Accordingly, together with source ID 310, local transaction identifier 308 field provides global identification of a transaction within a hierarchy domain.

Attributes field 304 specifies characteristics and relationships of the transaction. In this regard, attributes field 304 is potentially used to provide additional information that allows modification of the default handling of transactions. In one embodiment, attributes field 304 includes priority field 312, reserved field 314, ordering field 316, and no-snoop field 318. Here, priority sub-field 312 may be modified by an initiator to assign a priority to the transaction. Reserved attribute field 314 is left reserved for future, or vendor-defined usage. Possible usage models using priority or security attributes may be implemented using the reserved attribute field.

In this example, ordering attribute field 316 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 318 is utilized to determine if transactions are snooped. As shown, channel ID Field 306 identifies a channel that a transaction is associated with.

Link Layer

Link layer 210, also referred to as data link layer 210, acts as an intermediate stage between transaction layer 205 and the physical layer 220. In one embodiment, a responsibility of the data link layer 210 is providing a reliable mechanism for exchanging Transaction Layer Packets (TLPs) between two components a link. One side of the Data Link Layer 210 accepts TLPs assembled by the Transaction Layer 205, applies packet sequence identifier 211, i.e. an identification number or packet number, calculates and applies an error detection code, i.e. CRC 212, and submits the modified TLPs to the Physical Layer 220 for transmission across a physical to an external device.

Physical Layer

In one embodiment, physical layer 220 includes logical sub block 221 and electrical sub-block 222 to physically transmit a packet to an external device. Here, logical sub-block 221 is responsible for the "digital" functions of Physical Layer 221. In this regard, the logical sub-block includes a transmit section to prepare outgoing information for transmission by physical sub-block 222, and a receiver section to identify and prepare received information before passing it to the Link Layer 210.

Physical block 222 includes a transmitter and a receiver. The transmitter is supplied by logical sub-block 221 with symbols, which the transmitter serializes and transmits onto to an external device. The receiver is supplied with serialized symbols from an external device and transforms the received signals into a bit-stream. The bit-stream is deserialized and supplied to logical sub-block 221. In one embodiment, an 8b/10b transmission code is employed, where ten-bit symbols are transmitted/received. Here, special symbols are used to frame a packet with frames 223. In addition, in one example, the receiver also provides a symbol clock recovered from the incoming serial stream.

As stated above, although transaction layer 205, link layer 210, and physical layer 220 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 4:
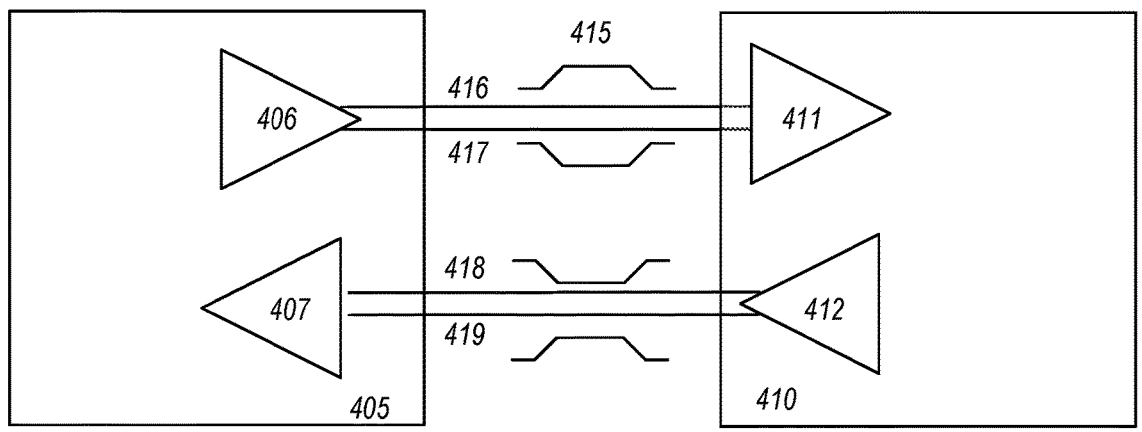
FIG. 4 illustrates an embodiment of a transmitter and receiver pair for an interconnect architecture.

Referring next to FIG. 4, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 406/412 and a receive pair 411/407. Accordingly, device 405 includes transmission logic 406 to transmit data to device 410 and receiving logic 407 to receive data from device 410. In other words, two transmitting paths, i.e. paths 416 and 417, and two receiving paths, i.e. paths 418 and 419, are included in a PCIe link.

A transmission path refers to any path for transmitting data, such as a transmission line, a copper line, an optical line, a wireless communication channel, an infrared communication link, or other communication path. A connection between two devices, such as device 405 and device 410, is referred to as a link, such as link 415. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider. In some implementations, each symmetric lane contains one transmit differential pair and one receive differential pair. Asymmetric lanes can contain unequal ratios of transmit and receive pairs. Some technologies can utilize symmetric lanes (e.g., PCIe), while others (e.g., Displayport) may not and may even including only transmit or only receive pairs, among other examples.

A differential pair refers to two transmission paths, such as lines 416 and 417, to transmit differential signals. As an example, when line 416 toggles from a low voltage level to a high voltage level, i.e. a rising edge, line 417 drives from a high logic level to a low logic level, i.e. a falling edge. Differential signals potentially demonstrate better electrical characteristics, such as better signal integrity, i.e. crosscoupling, voltage overshoot/undershoot, ringing, etc. This allows for better timing window, which enables faster transmission frequencies.

In some implementations, a data link layer or logical physical layer can include a controller or embody a media access control (MAC) layer. In some implementations, the physical (PHY) layer (e.g., its logic and/or physical fabric) can be provided as a separate intellectual property (IP), or computing, block, which can be coupled with other computing block providing other portions of the hardware logic to implement an interconnect stack. To enable such implementations, an interface can be provided to connect the computing blocks while still supporting a particular interconnect protocol (or potentially multiple different interconnect protocols) over the resulting interconnect (e.g., provided by the interconnected computing blocks). As an example, the PHY Interface for the PCI Express architecture (PIPE) has been developed to define such interfaces. Indeed, PIPE has been extended to enable interfaces between controllers (referred to also as "media access controllers" or MACs" herein) and PHYs in now multiple different interconnect technologies, including not only PCIe, but also SATA, USB, DisplayPort, Thunderbolt, and Converged IO architectures. Accordingly, PIPE is also sometimes referred to, alternatively, as the PHY Interface for PCI Express, SATA, DisplayPort, and Converged IO Architectures. PIPE is intended to enable the development of functionally equivalent PCI Express, SATA and USB PHY's. Accordingly, PHYs can be delivered as discrete integrated chip packages (ICs) or as macrocells for inclusion in ASIC designs or other systems. The specification defines a set of PHY functions which must be incorporated in a PIPE compliant PHY. PIPE is defined to provide a standard interface between such a PHY and a Media Access Layer (MAC) and/or Link Layer ASIC. A standardized PHY interface, such as PIPE, can provide an interface to which ASIC and endpoint device vendors can develop.

Figure 5A:
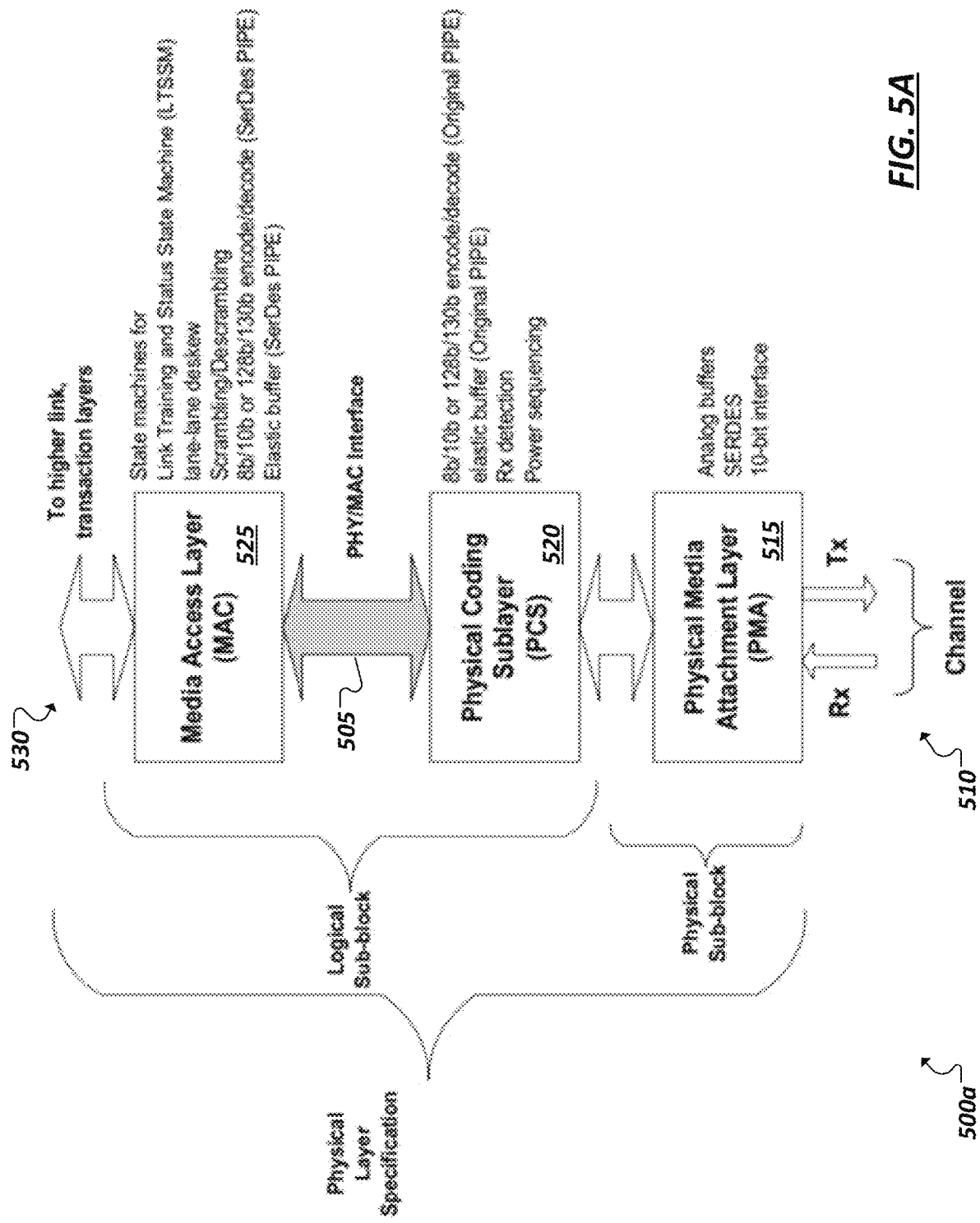
FIGS. 5A-5C illustrate example implementations of a PHY/MAC interface.
Figure 5B:
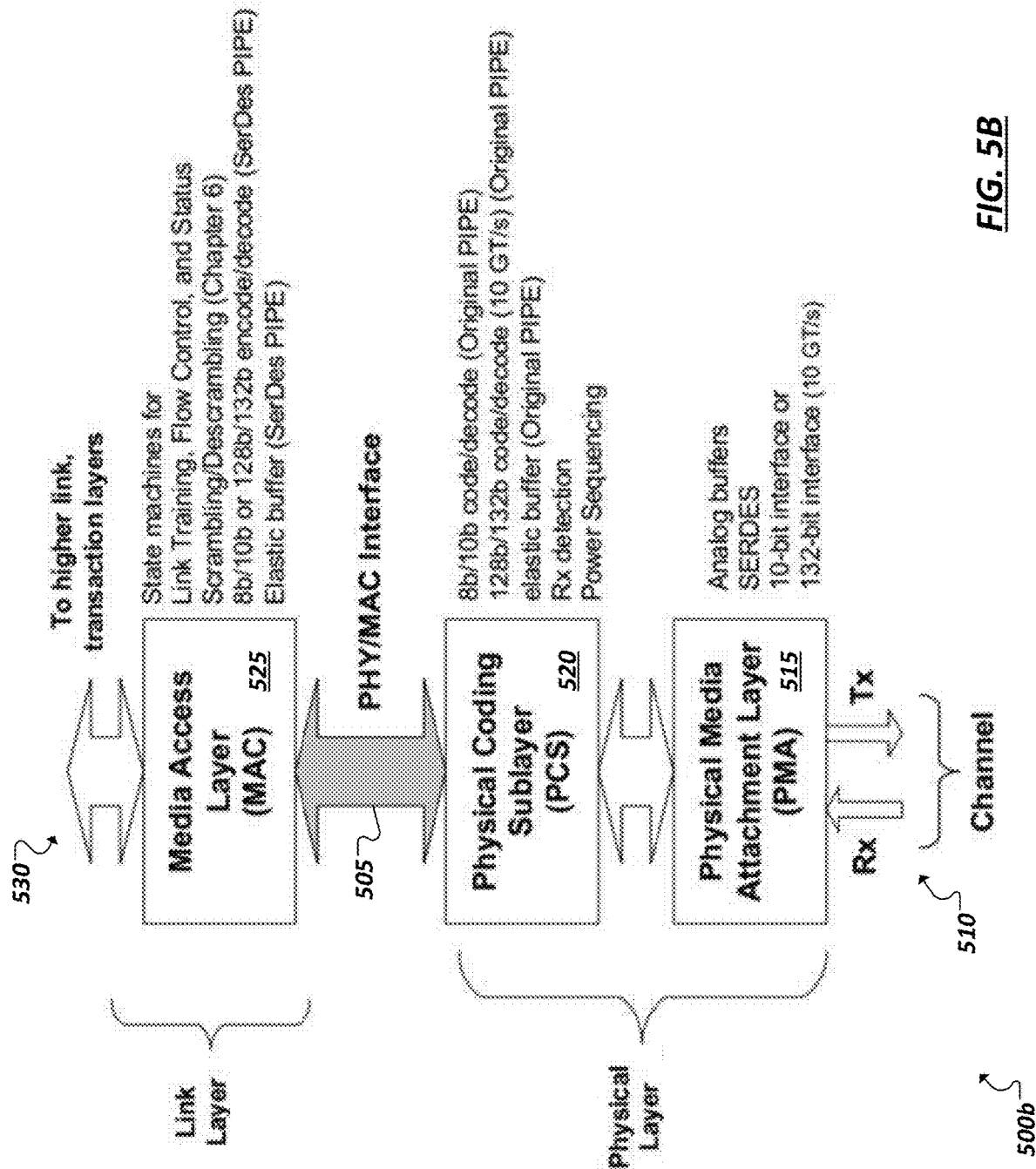
Figure 5C:
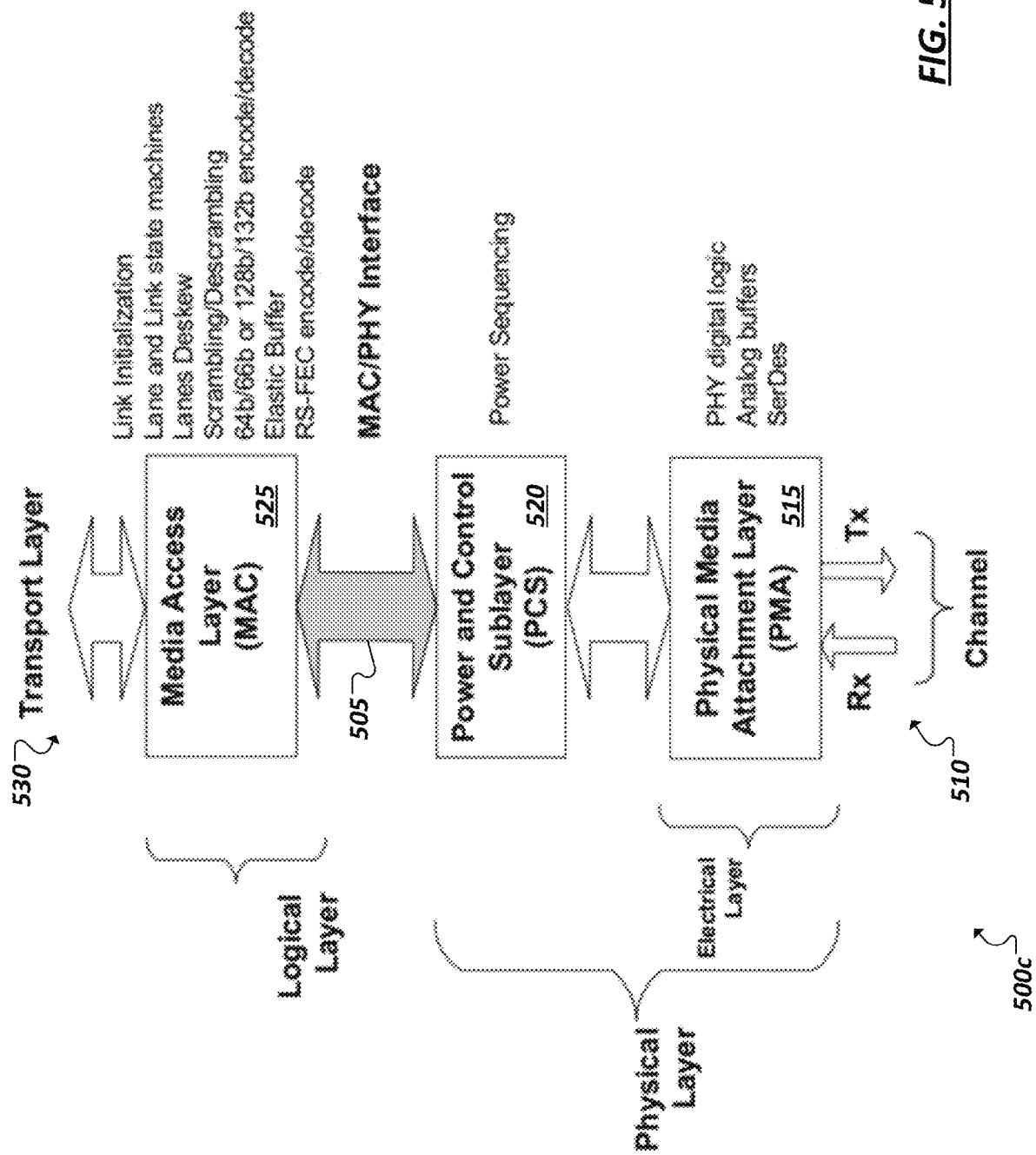

FIGS. 5A-5C are simplified block diagrams 500a-c illustrating a defined interface 505 between a PHY and a MAC layer (e.g., implemented as two or more distinct computing blocks (e.g., integrated circuits (ICs), macrocells, intellectual property (IP) blocks, etc.). In some implementations, the interface may be implemented according to a PIPE-based protocol. The interface may assist in defining a partition of the physical layer and other layers of a system according to respective architectures. For instance, FIG. 5A illustrates a partitioning for PCIe using the interface, FIG. 5B illustrates a partitioning for USB using the interface, and FIG. 5C illustrates a partition for Converged IO using the interface, among other examples.

In the examples of FIGS. 5A-5C, data transmitted or received over a physical channel 510 is processed by PHY layer logic. In one example, such as in PCIe architectures (e.g., as illustrated in FIG. 5A), the physical layer may be considered to include both the physical media attachment (PMA) layer 515, the physical coding sublayer (PCS) 520, and the media access layer (MAC) 525. In other examples, such as USB architectures (e.g., as illustrated in FIG. 5B), the physical layer may be defined to include the PMA layer 515 and the PCS 520, with the MAC implementing at least a portion of the link layer of the architecture. In yet another example, such as a Converged IO architecture (e.g., as illustrated in FIG. 5C), the PMA layer 515 and the PCS 520 implement the physical layer, while the MAC implements a logical layer of the architecture, among other example partitioning of layers.

Generally, an example PMA 515 may include analog buffers, a serializer/deserializer (SERDES), an interface (to the channel 510) (e.g., a 10-bit or 130-bit interface), among other example logic and elements. The PCS 520 can include coding/decoding logic (e.g., 8b/10b encode/decode, 64b/66b encode/decode, 128b/130b encode/decode, 128b/132b encode/decode, etc. depending on the architecture), an elastic buffer, and receiver detection logic, among other example logic and elements. In one example, the MAC layer 525 can include state machines for link training, flow control, elastic buffering, lane-to-lane deskew, and status, scrambling and descrambling logic, among other example logic and elements. The MAC layer 525 may provide or enable an interface 530 between the PHY layer (and/or link layer, depending on the architecture) and higher protocol layers of the architecture, such as a data link layer, transaction layer, transport layer, etc.

In some implementations, a PIPE-based PHY/MAC interface 505 may include additional features (e.g., while allowing the interface to be backward compatible with earlier versions of PIPE). For instance, to address the issue of increasing signal count in some implementations, a message bus interface may be adopted in some implementations of the interface 505. The message bus interface may map legacy PIPE signals without critical timing requirements so that their associated functionality can be accessed via the message bus interface (e.g., implemented on control and status pins of the interface) instead of implementing dedicated signals. Additionally, in some instances, to further facilitate the design of generate purpose PHYs implemented as hard IP blocks and to provide the MAC layer with more freedom to do latency optimizations, a SerDes architecture may be provided to simplify the PHY and shift further protocol-specific logic into the block implementing the MAC layer, among other example features and enhancements.

In some implementations, a PIPE message bus interface, such as introduced above, may be implemented as a defined interface between a controller and PHY can attempt to define a standardized interface between the controller and PHY including the definition of control and status signals for transmission between the computing blocks implementing the controller and PHY in connection with management of the interface and support of one or more interconnect protocols on a link. For instance, PIPE defines an interface between a MAC and PHY, which may be implemented using dedicated control and status signal wires for each operation involving communication between the MAC and the PHY. As the number of PIPE signals has grown over time as each of the protocol specifications PIPE supports (e.g. PCIe, SATA, USB) evolves (and as additional protocols are added for support through PIPE (e.g., USB Type-C, Displayport, Thunderbolt, etc.), implementing control and status signaling in PIPE using dedicated signal wires resulting in a problematic increase in the pin count demanded of the PIPE interface. Indeed, escalating pin count can threaten the future scalability and usability of interface such as PIPE, among other example issues.

A message bus interface, such as utilized in some of the implementations discussed herein, may assist in addressing at least some of the issues above. For instance, a message bus interface may utilize a register-based status and control interface. In some example interfaces, a set of datapath signals and control and status signals can be defined. For instance, assuming a PIPE interface with defined datapath signals and control and status signals per Rx/Tx lane pair (and other interfaces may additionally support configurable pairs where pairs are configured either as {Rx, Tx}, {Rx, Rx}, {Tx, Tx} or {Tx, Rx}, etc.), in one embodiment, a low pin count version of a traditional PIPE interface can be implemented using a message bus interface, for instance, by providing an interface that maintains dedicated wires for datapath signals, asynchronous control and status signals, and latency-sensitive control and status signals, but that maps remaining control and status signals defined for the interface to registers (e.g. 8-bit, 16-bit, or 32-bit registers), which can be accessed over a small number of additional pins/wires (e.g., the message bus interface), such as wires facilitating data transmission of 4-bits, 8-bits, etc. per direction. To support messaging of these control and status signals using the registers (also referred to herein as "message bus registers"), an address space can be provided (e.g., 12 address bits), into which the defined registers are mapped. In some implementations, this address space can be designed to be deliberately large to accommodate expansion of the set of operations, control and status signals that are to use these defined registers. This allows plenty of headroom for future expansion as well as room to house vendor-specific registers that PHY designs can use to expose useful status information to the controller or to provide additional configurability.

Continuing with the above example, to facilitate messaging of these control and status signals using the registers, read, write, completion, and other commands may be defined for accessing the registers. Included is a mechanism for grouping multiple writes together so that they take effect in the same cycle. Included is also a mechanism for distinguishing between 1-cycle assertion type signals and signals that are held to a constant value. A transaction involving these registers may include command, address, and data or any subset of these three elements, which may be transferred over the small set of wires in a time multiplexed manner (e.g., over multiple unit intervals or clock cycles). A framing scheme can also be defined in connection with the interface, by which a corresponding computing block may identify boundaries (e.g., start and end) of potentially multiple sequential (or contemporaneous) register transactions, each transaction serving to communicate one or more control or status signals in lieu of these same signals being driven over dedicated wires, as is done, for instance, in traditional PIPE interfaces, among other example features. Accordingly, a message bus interface may offload some signals of a MAC-PHY interface (e.g., PIPE) to specialized registers and thereby enable more interface operations in the future, as the protocols supported by the interface (e.g., PIPE) evolve to add new features, all while saving the interface from further increases in interface signal count.

Figure 6:
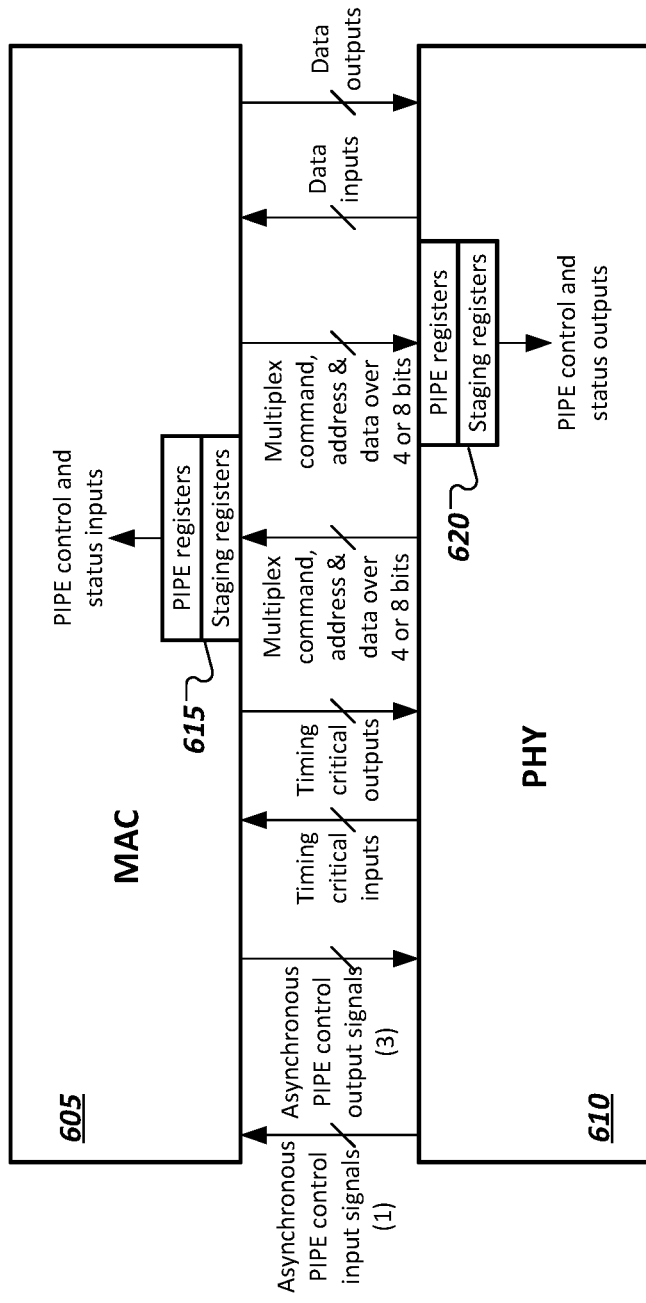
FIG. 6 illustrates a representation of a PIPE PHY/MAC interface.

Turning to FIG. 6, a simplified block diagram 600 is shown of an example PIPE interface utilizing a register-based, low pin count PIPE control and status interface (e.g., a message bus interface). The PIPE interface may couple a MAC computing block 605 with a PHY computing block 610 and at least a subset of the control and status signals generally defined for the interface may be categorized as either asynchronous signals, timing critical signals, and regular control and status signals, among other example categories. In this example, the asynchronous and timing critical control and status signals may be assigned dedicated wires on the improved interface, such as shown in FIG. 6. The regular control and status signals, however, may be mapped into and replaced by the bits of registers (e.g., 615, 620), which are accessed over a small set of wires (e.g. four or eight bits) as shown in the present example. Register commands, e.g. reads and writes, register address, and register data may be transmitted in a time-multiplexed manner across this small serial interface to cause values to be written to the message bus registers. Further, the datapath related signals of the interface may be separate from the control and status signals and may, in effect, be the same or very similar to those provided in implementations where all control and status signals are implemented using dedicated pins (e.g., implementations not supporting message bus signaling).

In one example implementation of message bus registers, a set of PIPE control and status signals can be mapped into 8-bit PIPE registers. In some cases, only a subset of the numerous control and status signals defined for an interface (e.g., in a PIPE-based specification) may be mapped to register bits in a computing block, while, in practice, potentially all of the control and status signals of a defined link layer-physical layer interface (e.g., PIPE) may be mapped to register bits (e.g., with exceptions for the asynchronous and timing critical control signals, which may remain implemented through dedicated wires), among other examples. Further, while some implementations may use 8-bit registers to implement message bus registers, other potential register widths can just as easily be used, including 16- or 32-bit registers, etc. In one example implementation, MAC→PHY control and status signals can be mapped to a first address space corresponding to the register of the PHY computing block, while PHY→MAC control and status signals can be mapped to a second address space corresponding to the register of the MAC computing block. In some cases, the first and second address spaces can utilize independent address spaces, such that the same address may potentially be used in each of the PHY's and MAC's register. In other example, a common, or shared, address space can be utilized such that first and second address spaces are non-overlapping, with each register in the PHY and MAC having a unique address. In one example, MAC→PHY control and status signals can be mapped into an address space starting at address zero, while the PHY→MAC control and status signals can be mapped into another address space starting at address zero. As an example, a 12-bit address space may be implemented, which may be considered large enough to accommodate the currently defined PIPE signals with plenty of headroom for future signal growth, however, other address space sizes can be chosen in other examples. A large address space may be utilized in connection with the registers to enable room for a dedicated address range for vendor specific registers that can be used to expose useful PHY status information and/or to provide additional configurability. In still other examples, different sized address spaces can be provided that can be accessed via different commands, depending on latency requirements of transmitting the full command plus address bits across the serial interface, among other example implementations.

Bits within a set of status/control registers of an example PHY/MAC interface can be mapped to defined signals in a set of signals defined or extended in the PHY/MAC interface (e.g., the signals defined in the PIPE specification). In one implementation, when a "1" is written to a bit mapped to a particular signal, this value is interpreted the same as if the particular signal were received in an implementation of the interface that provides dedicated wires to each of the signals. As an example, a first computing block may determine that a TxDetect state should be entered and can message this to the other computing block by preparing a write (to be sent over a subset of the pins of the interface designated as the status and control interface of the PHY/MAC interface), which causes a "1" to be written to corresponding bit (e.g., 12'h000[6]) to indicate the signal "TxDetectRx/Loopback" in this particular example. The receiving, second computing block can detect that the "1" has been written to bit 6 of the register at address 12'h000 and interpret this value as the receipt of the PIPE TxDetectRx/Loopback signal, among other potential examples.

TABLE 1

Example of Register Commands

| Encoding | Command | Description |
| --- | --- | --- |
| 4'b0000 | NOP | Used during idle periods |
| 4'b0001 | write_committed | Indicates that the current write as well as any previously uncommitted writes should be committed, e.g. their values should be updated in the PIPE registers. Contains address and data. |
| 4'b0010 | write_uncommitted | Indicates that the current write should be saved off and its associated values are updated in the PIPE registers at a future time when a write_committed is received. Contains address and data. |
| 4'b0011 | read | Contains address. |
| 4'b0100 | read completion | This is the data response to a read. Contains data only. |
| Others | Reserved | Reserved |

Table 1 provides examples of some register commands for use in accessing registers maintained in connection with control and status signals defined for a MAC-PHY interface, such as PIPE. For instance, a no operation (or "NOP") command can be utilized to indicate that there is no operation being requested (e.g., for use during idle states). Write operations can be used to replace transmission of one or more of a set of control and status signals defined for the interface. For instance, a write can write a value to a particular bit of a particular register mapped to a particular one of the set of control and status signals. The value of the particular bit can be interpreted as the receipt of the particular signal (even though the particular signal was not actually sent (e.g., as the dedicated wire has been omitted in the improved interface design)).

In some instances, an interface can provide for a combination of signals in the set of control and status signals to be sent at the same time. For instance, certain PIPE signals may need to be aligned so that their values take effect during the same cycle. In a conventional version of the interface, this combination of signals can be transmitted concurrently each on their respective wires. In an improved implementation based on registers, it may not be feasible to concurrently write to each of the register bits corresponding to the combination of signals (e.g., the bits may be scattered across multiple registers with multiple different addresses). In one example, write commands can include committed and uncommitted writes. For example, an—uncommitted command can be used to provisionally write, or queue a write, to an identified register address corresponding to the command. Uncommitted writes can be held until the next committed write is received, at which point the values requested in the intervening uncommitted writes (e.g., since the last committed write) are written to their respective register bits together with the writing to the register requested in the committed write. For instance, an uncommitted write can be written to a buffer (that is flushed on a committed write) or to a shadow register to store the write until the next committed write is received and the status and control register is updated, while committed writes are written directly to the status and control register. In this manner, one or more uncommitted writes can be requested followed by a committed write to simultaneously write values to multiple different registers and bits so as to achieve alignment of the signals mapped to these bits.

As an example, in an implementation with 8-bit registers, 24 different signals (from a defined interface) can be mapped across three or more registers, such as registers A, B, and C. In one example, three signals mapped to three respective bits in register A, may need to be aligned with another signal mapped to a respective bit in register B, and two signals mapped to two respective bits in register C. In this particular illustrative example, to emulate the alignment of these signals, values can be written to the three bits in register A in a first write_uncommitted command, followed by a second write_uncommitted command to write the value to the bit in register B. Thereafter, a write_committed command can be utilized to not only write to the values of the two bits in register C, but also to "commit" and cause the uncommitted writes to registers A and B to be performed simultaneously with the writes to register C and thereby cause all the values associated with the writes to registers A, B, and C to take effect in the same cycle.

Additional operations can be provided in connection with the status and control registers of an improved interface. For instance, read and read completion commands can be provided for accessing values written to particular status registers. Acknowledgement (ACK) commands can also be defined, for instance, to indicate acknowledgement (i.e., to requesting computing block) that a committed or uncommitted write has been successful performed at a particular register.

Some implementations may omit support of a write_uncommitted command. For instance, in one implementation, the registers of a particular computing block can be defined in such a way, with width and signal assignments, that signals understood to need alignment are mapped to bits in the same register or adjacent registers, thereby making it possible to write to each of the corresponding bits in the register in a single committed write. Other potentially useful commands may include (but are not limited to) writes that span multiple adjacent registers, among other examples.

Figure 7:
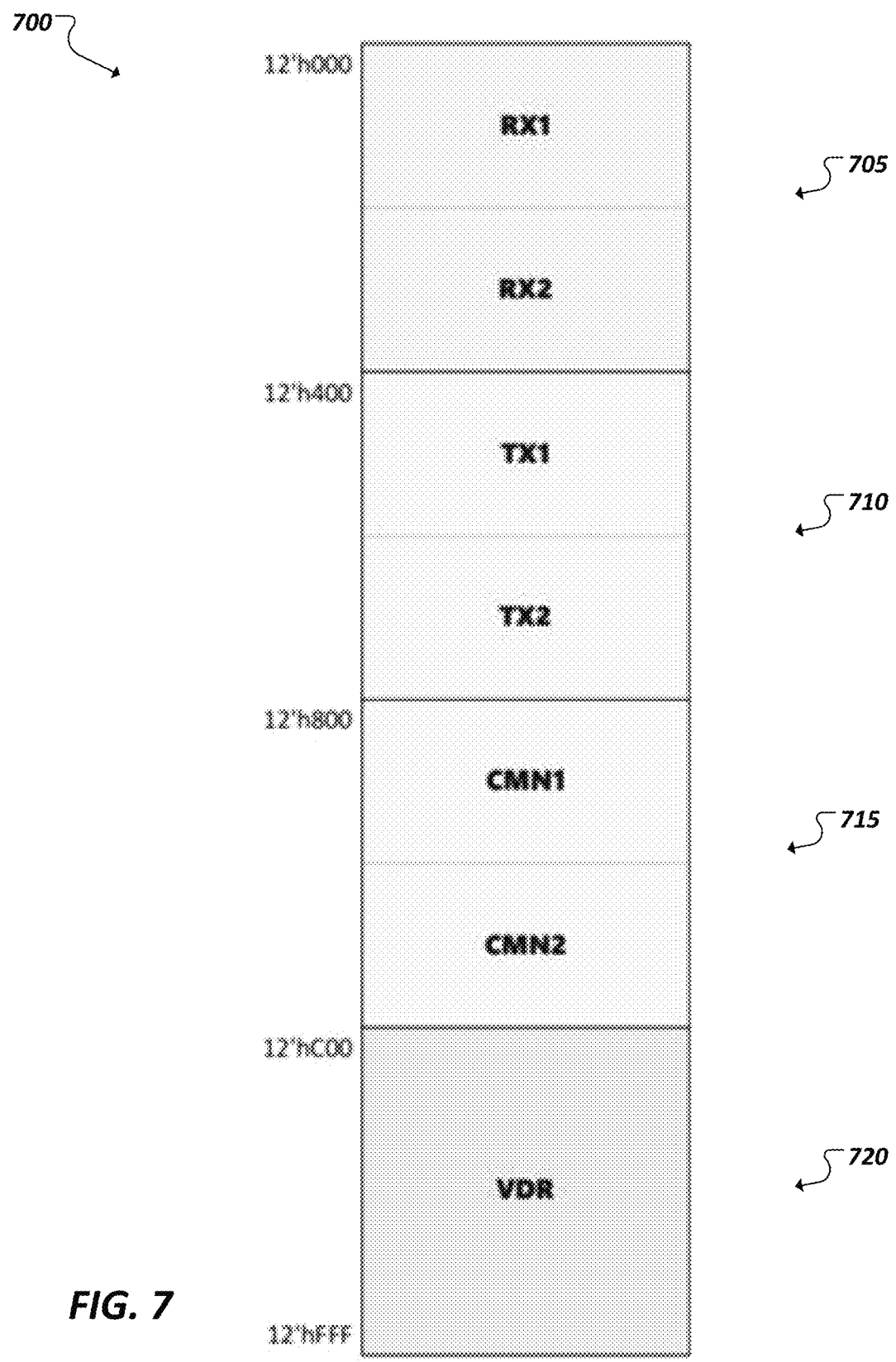
FIG. 7 illustrates a representation of a portion of an example status and control register of an example PHY/MAC interface.

In one example implementation of a message bus, the specification of a PIPE-based interface may define 12-bit address spaces to enable the message bus interface, with the MAC and the PHY each implementing unique 12-bit address spaces. For instance, FIG. 7 illustrates a block diagram illustrating an example address space 700. Such an address space may be used to host message bus registers associated with various interface operations (e.g., PIPE operations). For instance, in some implementations of a PIPE message bus, the MAC and PHY may access specific bits in the registers to initiate operations, to participate in handshakes, or to indicate status. The MAC initiates requests on the message bus interface to access message bus registers hosted in the PHY address space. Similarly, the PHY initiates requests on the message bus interface to access similar registers hosted in the MAC address space. As shown in the representation of FIG. 7, in some examples, each 12-bit address space (e.g., 700) may be divided into four main regions: receiver address region 705, transmitter address region 710, common address region 715, and vendor specific address region 720. For instance, a receiver address region 705 may be used to configure and report status related to receiver operation (e.g., spanning the 1024 KB region from 12'h000 to 12'h3FF and supporting up to two receivers with 512 KB allocated to each). A transmitter address region 710 may be used to configure and report status related to transmitter operation (e.g., spanning the 1024 KB region from 12'h400 to 12'h7FF and supporting up to two transmitters, TX1 and TX2, with a 512 KB region associated with each). The common address region 715 may host registers relevant to both receiver and transmitter operation (e.g., spanning the 1024 KB region from 12'h800 to 12'hBFF and supporting up two sets of Rx/Tx pairs with 512 KB allocated toward the common registers for each pair). The vendor specific address region 820 may be implemented as a 1024K region from 12'hC00 to 12'hFFF and may enable individual vendors to define registers as needed outside of those defined in a particular version of a corresponding PIPE-based specification, among other example implementations. As noted above, the address space may be defined to support configurable Rx/Tx pairs. Up to two differential pairs may be assumed to be operational at any one time. Supported combinations are one Rx and one Tx pair, two Tx pairs, or two Rx pairs, among other example implementations.

Tables 2 and 3 show example detailed implementations of the example PIPE message bus address space illustrated in FIG. 7. For instance, PCIe RX margining operations and elastic buffer depth may be controlled via message bus registers hosted in these address spaces. Additionally, several legacy PIPE control and status signals may be been mapped into registers hosted in these address spaces. The following subsections define the PHY registers and the MAC registers. Individual register fields are specified as required or optional. In addition (as illustrated in the examples of Tables 2 and 3), each field may have an attribute description of either level or 1-cycle assertion. When a level field is written, the value written is maintained by the hardware until the next write to that field or until a reset occurs. When a 1-cycle field is written to assert the value high, the hardware maintains the assertion for only a single cycle and then automatically resets the value to zero on the next cycle.

Table 2 lists the PHY registers and their associated address. The details of each register are provided in the subsections below. To support configurable pairs, the same registers defined for RX1 are also defined for RX2, the same registers defined for TX1 are defined for TX2, and the same registers defined for CMN1 are defined for CMN2. In this example, only two differential pairs are active at a time based on configuration, for instance, valid combinations correspond to registers defined in RX1+TX1+CMN1, RX1+RX2+CMN1+CMN2, or TX1+TX2+CMN1+CMN2. In this example, a PHY that does not support configurable pairs only implements registers defined for RX1, TX1, and CMN1. In one example, PHY registers may be implemented such as set forth in the particular example of Table 1, listed below:

TABLE 2

Representation of example PHY Message Bus Registers

| Byte Address | Register Name | Notes |
|---|---|---|
| 12'h0 | RX1: RX Margin Control0 | |
| 12'h1 | RX1: RX Margin Control1 | |
| 12'h2 | RX1: Elastic Buffer Control | N/A for SerDes Architecture |
| 12'h3 | RX1: PHY RX Control0 | N/A for SerDes Architecture |
| 12'h4 | RX1: PHY RX Control1 | |
| 12'h5 | RX1: PHY RX Control2 | |
| 12'h6 | RX1: PHY RX Control3 | |
| 12'h7 | RX1: Elastic Buffer Location Update Frequency | N/A for SerDes Architecture |
| 12'h8 | RX1: PHY RX Control4 | Some fields N/A for SerDes Architecture |
| 12'h9-12'h1FF | RX1: Reserved | |
| 12'h200 to 12'h3FF | RX2: Same registers are defined in this region for RX2 as for RX1 above. | |
| 12'h400 | TX1: PHY TX Control0 | N/A for SerDes Architecture |
| 12'h401 | TX1: PHY TX Control1 | N/A for SerDes Architecture |
| 12'h402 | TX1: PHY TX Control2 | |
| 12'h403 | TX1: PHY TX Control3 | |
| 12'h404 | TX1: PHY TX Control4 | |
| 12'h405 | TX1: PHY TX Control5 | |
| 12'h406 | TX1: PHY TX Control6 | |
| 12'h407 | TX1: PHY TX Control7 | |
| 12'h408 | TX1: PHY TX Control8 | |
| 12'h409-12'h5FF | TX1: Reserved | |
| 12'h600-12'h7FF | TX2: Same registers are defined in this region for TX2 as for TX1 above | |
| 12'h800 | CMN1: PHY Common Control0 | N/A for SerDes Architecture |
| 12'h801-12'h9FF | CMN1: Reserved | |
| 12'hA00-12'BFF | CMN2: Same registers are defined in this region for CMN2 as for CMN1 above | |
| 12'hC00-12'hFFF | VDR: Reserved | |

Similarly, Table 3 lists an example implementation of MAC registers, their characteristics, and their associated addresses. For instance:

TABLE 3

Representation of example MAC Message Bus Registers

| Byte Address | Register Name | Notes |
|---|---|---|
| 12'h0 | RX1: RX Margin Status0 | |
| 12'h1 | RX1: RX Margin Status1 | |
| 12'h2 | RX1: RX Margin Status2 | |
| 12'h3 | RX1: Elastic Buffer Status | N/A for SerDes Architecture |
| 12'h4 | RX1: Elastic Buffer Location | N/A for SerDes Architecture |
| 12'h5 | RX1: RX Status0 | |
| 12'h6 | RX1: RX Control0 | |
| 12'h75-12'h9 | RX1: Reserved | |
| 12'hA | RX1: RX Link Evaluation Status0 | |
| 12'hB | RX1: RX Link Evaluation Status1 | |
| 12'hC | RX1: RX Status 4 | |
| 12'hD | RX1: RX Status 5 | |
| 12'hE-12'h1FF | RX1: Reserved | |
| 12'h200 to 12'h3FF | RX2: Same registers are defined in this region for RX2 as for RX1 above. | . |
| 12'h400 | TX1: TX Status0 | |
| 12'h401 | TX1: TX Status1 | |
| 12'h402 | TX1: TX Status2 | |
| 12'h403 | TX1: TX Status3 | |
| 12'h404 | TX1: TX Status4 | |
| 12'h405 | TX1: TX Status5 | |
| 12'h406 | TX1: TX Status6 | |
| 12'h403-12'h5FF | TX1: Reserved | |
| 12'h600-12'h7FF | TX2: Same registers are defined in this region for TX2 as for TX1 above | |
| 12'h800-12'h9FF | CMN1: Reserved | |
| 12'hA00-12'hBFF | CMN2: Reserved | |
| 12'hC00-12'hFFF | VDR: Reserved | |

It should be appreciated that the example registers enumerated in Tables 2 and 3 are presented as illustrative examples only. Indeed, one of the example benefits of a message bus interface is the easy extensibility of the control and status signals supported by an example implementation of a MAC-PHY interface, such as PIPE.

Figure 8:
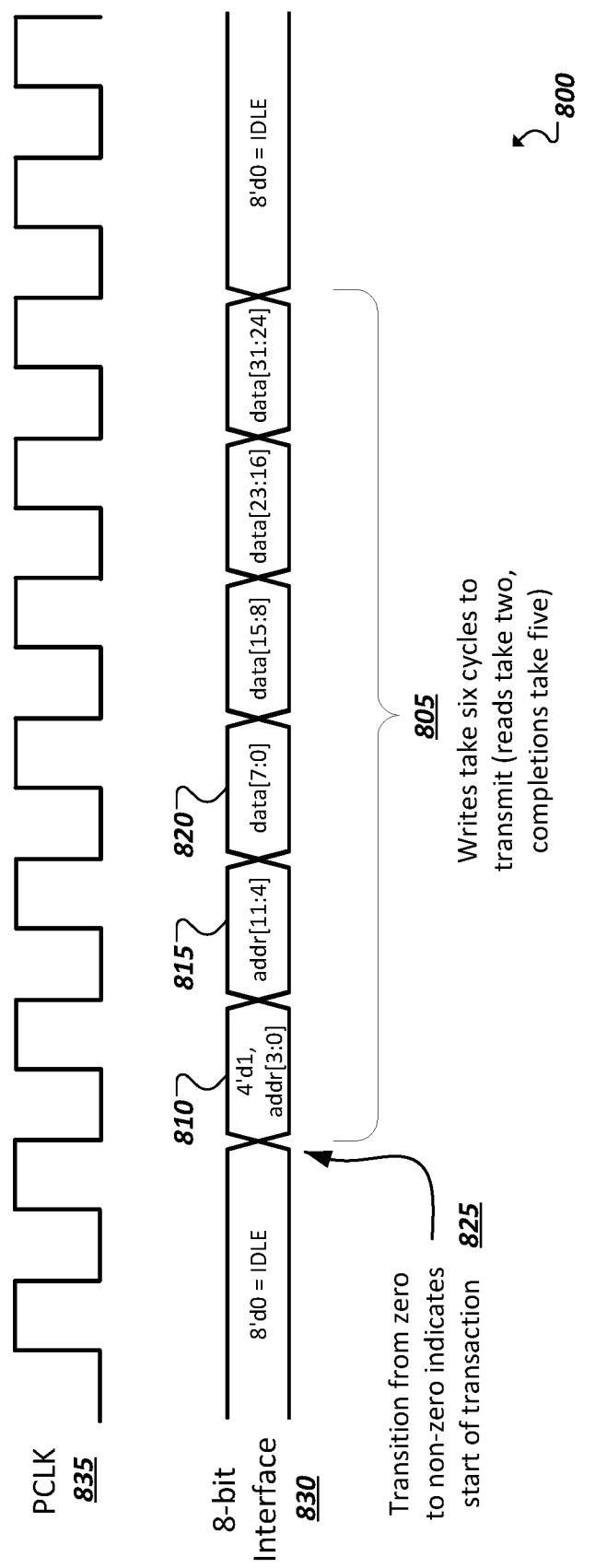
FIG. 8 illustrates a signaling diagram illustrating an example transaction involving a register of an example PHY/MAC interface.

Turning to FIG. 8, a signal diagram 800 is shown illustrating example signaling on an 8-bit status and control interface 830 of a MAC-PHY interface. 8-bits of data can be sent during each clock (PCLK) 835 cycle, or unit interval (UI). At startup, or following an idle state, zeros can be transmitted, as no control or status signals are being sent between the MAC and PHY blocks. When non-zero data is sent following an idle, the data can be interpreted as the beginning of a status/control transaction on the interface. For instance, in the example of FIG. 8, a first one of the computing blocks can determine that a particular one of the defined status and control signals is to be sent to the other computing block as defined by the interface. In a register-based implementation, the dedicated signaling pins have been omitted, and the first computing block instead sends data over the status and control interface. For instance, the transaction can begin (at 810) with a four bit register command (e.g., "4'd1") followed by the first four bits of the register address to which the command applies being transmitted in a first UI. In the next UI, the remaining 8 bits of the register's address are sent (at 815) followed by four UIs of data (32 bits) containing the values to be written to the 32-bit register (beginning at 820).

In some implementations, all status and control register transactions may contain a command. For write and read commands, the transaction can further include the associated register address. For writes and read completions, the transaction can also contain data (identifying contents of the register). As a result, the number of cycles it takes to transfer a transaction across the interface can be deduced from the command type. For instance, the example transaction shown in FIG. 8 involves a write command 805 transferred across an 8-bit serial interface, assuming a 4-bit command, 32-bit registers, and 12-bit address space, that is completed in 6 cycles (or UIs). Other transactions in this configuration will be expected to take a respective number of UIs to complete. For instance, a read may take two UI (e.g., for a 4-bit command and 12-bit address) and a read completion may take five UI (e.g., for a 4-bit command and 32-bits of read data), among other examples. Given the predictability of the length of these various transactions, the end of a transaction can be detected based on the transaction type. Consequently, the beginning of another transaction can likewise be detected, for instance, when non-zero data immediately follows the UI or bits detected to represent the end of a preceding transaction. This can allow the omission of a transaction identifier in some implementations. Further, a start of transaction may likewise be detected when a valid command is received following an idle or null signal (e.g., 825), among other examples In some defined interfaces, such as PIPE, some existing status and control signals are defined based not only on the designated wire on which they are transmitted but also the duration at which the signal is held on the corresponding wire. Accordingly, in an implementation that replaces at least some of these dedicated signaling wires with a register mapping (such as described above), it can be desirable to enable the distinguishing of signals that require 1-cycle assertions from signals that need to be held over multiple UIs (e.g., at a static value). For instance, particular register bits or registers can be configured such that a value written to the bit is held at that value but then automatically returned to a default or un-asserted value (i.e., without requiring an explicit write transaction to return the value to the default (e.g., from "1" back to "0"). For instance, a particular bit may be mapped to a particular signal that has a 1-cycle assertion, such that when a "1" is written to the particular bit, the "1" is interpreted as an instance of the particular signal. However, rather than keeping the value of the particular bit at "1", after the expiration of the corresponding single UI, or cycle, the value can be automatically returned to "0". Likewise, signals that are to be held at a value for more than one UI can be mapped to register bits that are configured to be held at that value until the expiration of a defined number of cycles or until the bit is overwritten, among other examples. In some instances, bits with similar configurations can be grouped within the same register or consecutively addressed registers. For instance, the bits within a given register can all be mapped to respective single cycle signal assertions, such that the register is processed to always return values back to a default for any bit in the register. Other registers can be used to group other bits mapped to other signals with similarly equal signal assertion lengths, among other examples. In another implementation, 1-cycle assertion type signals and static value type signals can be distinguished simply by grouping the two different signal types into different registers that are located in different address spaces or different address ranges of the same address space, and interpreting their values based on their respective address. In still another implementation, different signal types can be mapped to different registers and accessed using different write command types (e.g., a static-type write and a single-cycle write, etc.), among other examples.

In some implementations, a message bus interface signal may be defined (e.g., through the definitions of corresponding message bus registers) to support recalibration of a PHY (e.g., recalibration of a PHY receiver) utilizing an implementation of a MAC-PHY interface. For instance, as I/O interconnect data rates increase, the absolute margins that transmitters and receivers must meet become smaller. As a result, proper PHY operation becomes more sensitive to nonidealities in the silicon circuits and to noise terms (e.g., thermal noise, cross talk, etc.). Additionally, support for wider operating temperature ranges introduces yet another factor that can impact proper PHY operation. In general, PHYs can mitigate this situation by adding monitoring circuitry, which senses variation of circuit parameters (e.g., offset, gain) and corrects deviations on the fly. However, in some implementations, such corrections may involve the addition of a redundant path, which may be very expensive to implement at higher data rates, among other example disadvantages.

To enable a more cost-efficient implementation, in some examples, a PIPE interface may be enhanced to allow the PHY to notify the MAC that it has detected a situation that requires recalibration of the PHY. For instance, in certain situations, the PHY may identify conditions at the PHY and determine that it needs to be recalibrated. These conditions may include changes in operating conditions (e.g., Vref changes) or detection of certain error conditions, among other examples. In response to receiving a signal from the PHY that recalibration is desired, the MAC may quiesce the link by forcing the link to go into recovery and then signals to the PHY to perform the incremental correction needed to address the problem, among other example implementations.

In some implementations, an example interface may be provided, which supports PHY- or controller-initiated recalibration. For instance, a PIPE-based interface may be enhanced to support PHY-initiated and controller-initiated PHY recalibration in a cost-effective manner (e.g., without redundant paths). For instance, in certain situations, the PHY may identify conditions at the PHY and determine that it needs to be recalibrated. These conditions may include changes in operating conditions (e.g., Vref changes) or detection of certain error conditions, among other examples. Further, the MAC-PHY interface may be so defined that either the controller or the PHY may initiate recalibration. In some implementations, recalibration (e.g., PHY Rx recalibration) may be required to take place during a recovery state. In some implementations, recovery may be initiated only by the controller (and not the PHY directly). In some implementations, only the MAC may be defined as capable of initiating recovery. In such implementations, if the PHY determines that a recalibration is necessary (and initiates recalibration) it may first notify the MAC (e.g., through a message bus interface) that the MAC should initiate recovery and then (or at the same time) request a recalibration. On the other hand, if recalibration is initiated by the MAC, in such examples, it may unilaterally cause the link to enter recovery in connection with a recalibration request (sent over a message bus interface). In both cases, the PHY may signal the controller when the recalibration is complete so that the controller can exit recovery and resume normal operation), among other example implementations.

In some implementations, a message bus interface implemented on a PIPE-based specification may be implemented to enable signaling in a defined sequence to implement both PHY-initiated and controller-initiated PHY recalibration. In some implementations, the PHY recalibration operation (whether PHY- or MAC-initiated) is to occur while the link is in recovery (e.g., Recovery.RcvrLock for PCIe). The controller can initiate a link's transition into recovery. Accordingly, the controller may notify the PHY when the link has entered recovery and the link is prepared for performance of the recalibration operation. Additionally, the PHY may be responsible for notifying the controller when the recalibration process has completed and it is okay to exit recovery. In one example implementation, these signals may be facilitated on a PIPE-based interface through a PIPE message bus. For instance, two bits in the MAC message bus address space may be designated for signals to be sent by the PHY to the MAC and at least one bit may be dedicated within the PHY's message bus address space for signals to be sent by the MAC to the PHY in connection with a message bus implementation of PHY- and controller-initiated recalibration requests.

Figure 9A:
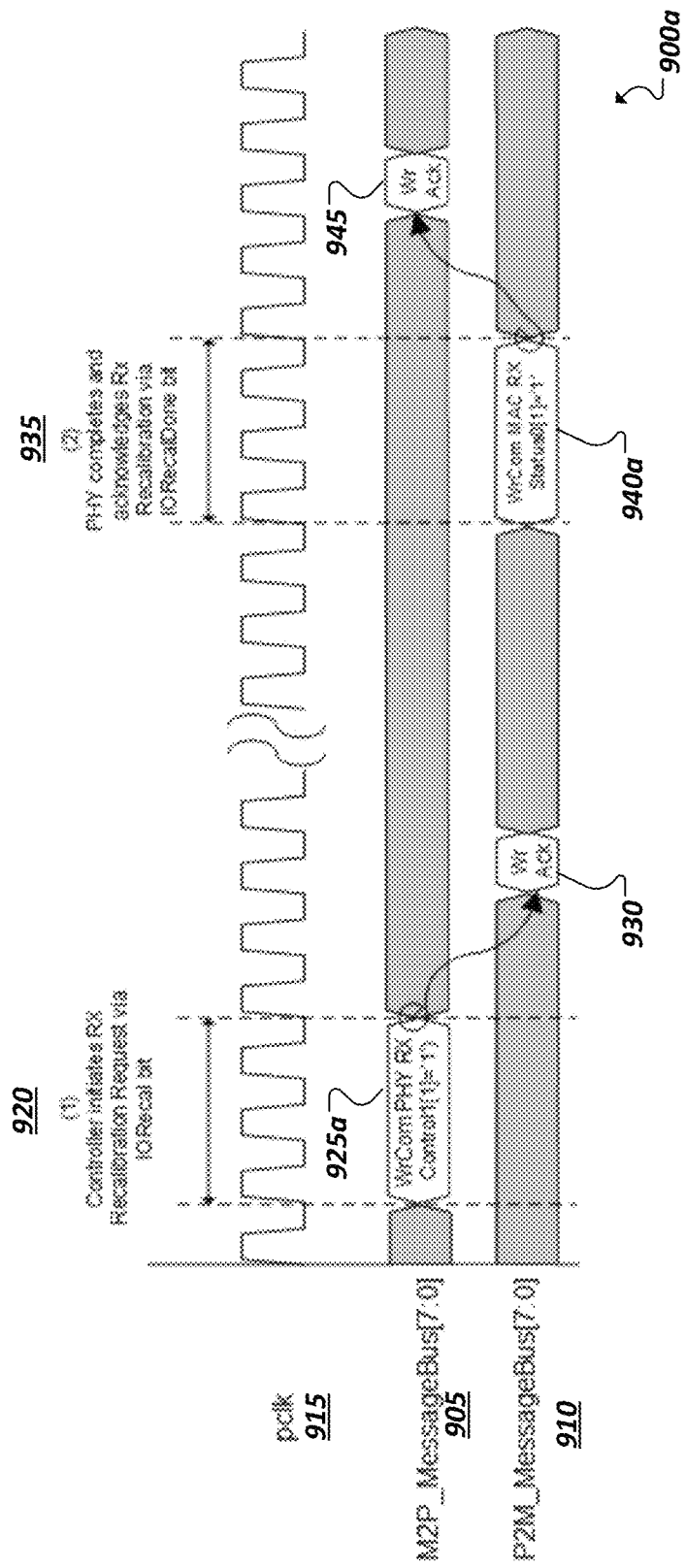
FIG. 9A illustrates use of a message bus interface of an example PHY/MAC interface to perform a controller-initiated recalibration.
Figure 9B:
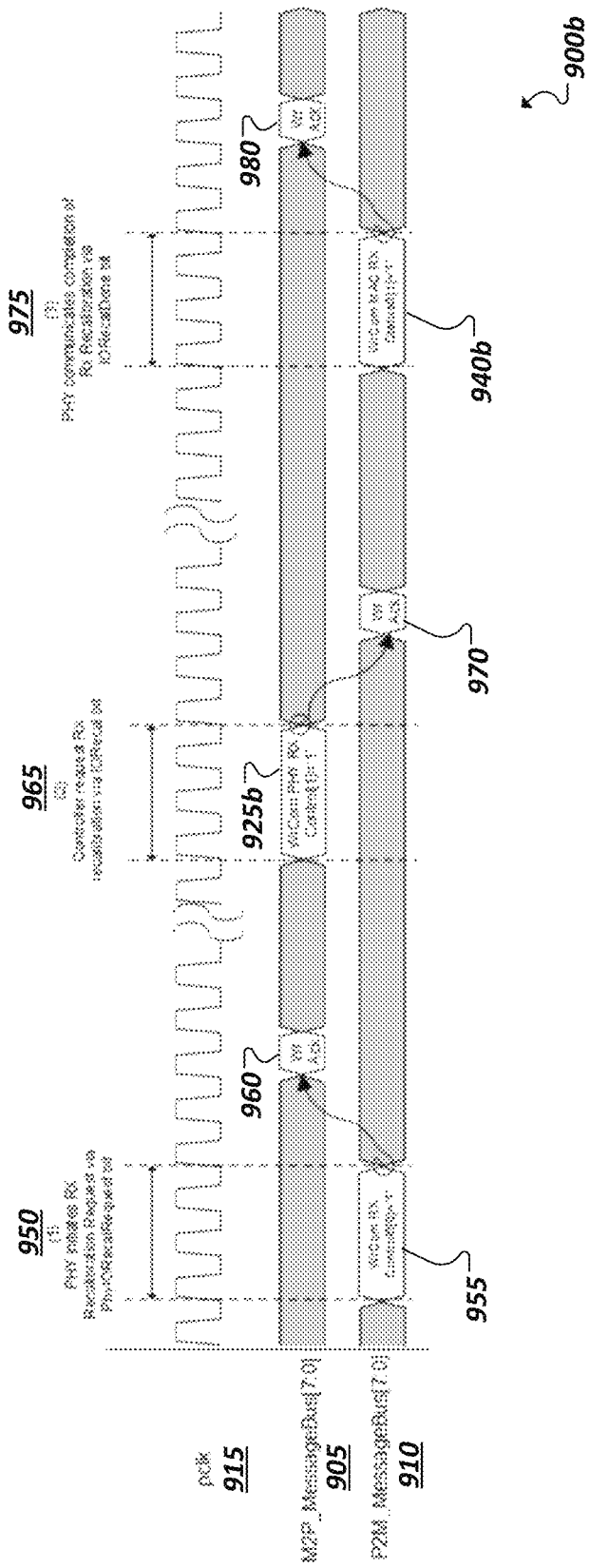
FIG. 9B illustrates use of a message bus interface of an example PHY/MAC interface to perform a physical layer-initiated recalibration.

Turning to FIGS. 9A-9B, simplified diagrams 900*a-b* are shown illustrating example signaling on an implementation of a message bus interface of a PHY-MAC interface to implement recalibration requests, which cause one or more blocks of the PHY (e.g., the PHY receiver ports) to be recalibrated.

For instance, as shown in FIG. 9A, a signaling sequence may be defined, using a message bus interface, to implement controller-initiated recalibration requests. For instance, pins of a MAC-PHY interface (e.g., a PIPE-based interface) may include, for each data lane, 8 pins to implement an 8-bit MAC-to-PHY (M2P) message bus 905 and 8 pins to implement a corresponding 8-bit PHY-to-MAC (P2M) message bus 910. Messages sent on the message buses 905, 910 may be in accordance with an interface clock 915 (e.g., PIPE interface clock (pclk)). In the example of FIG. 9A, a MAC may determine (or may receive a signal from higher-layer logic) to identify that a recalibration of the PHY receiver should be performed. Accordingly, the MAC may initiate 920 a receiver recalibration request by writing to a bit in the PHY's message bus register mapped to receive recalibration requests. For instance, the MAC may use the M2P message bus 905 to send a write command 925*a* (e.g., a committed write command) to cause a "1" to be written to the receiver recalibration bit (e.g., IORecal bit) in the PHY's message bus register. In some implementations, the receiver recalibration bit may be configured as a 1-cycle register value.

Continuing with the example of FIG. 9A, in response to reading the receiver recalibration bit written-to by the MAC, the PHY may send, over P2M message bus 910, an acknowledgement signal 930. As noted above, in some implementations, a protocol or other rule may be defined to require that PHY recalibration be performed while the link is in a recovery or other particular state. In some cases, such a state or state transition may only be initiated by the MAC (or higher layer protocol logic). For instance, in the example of FIG. 9A, the MAC may initiate a recovery state in connection with writing 925*a* to the receiver recalibration bit. For instance, the MAC may initiate the recovery state substantially in concert with or automatically after writing the recalibration request to the PHY message bus register.

When a PHY identifies a recalibration request written to a particular one of its message bus registers, as in the example of FIG. 9A, the PHY may begin performing the recalibration. Upon completion of the recalibration, the PHY may utilize the P2M message bus 910 to signal to the MAC that the recalibration is complete (at 935). For instance, the PHY may send a write request 940a on the P2M message bus 910 to cause a particular bit of the MAC message bus register (e.g., IORecalDone) to be written to identify to the MAC that the recalibration is complete. In some implementations, this particular bit may be configured as a 1-cycle register value. Further, as with the recalibration request, an acknowledgement (e.g., 945) may be defined to be sent (by the MAC) in response to an indication from the PHY that recalibration is complete. In some implementations, the MAC may cause a link to transition from recovery into another state based upon receiving an indication (on its message bus register) that recalibration is complete, among other example actions based on the completion of recalibration.

As a summary, in some implementations, such as shown in the example of FIG. 9A, a sequence of transactions as may be seen across the PIPE message bus interface for a controller-initiated PHY recalibration. For instance, when a controller determines a PHY recalibration is needed (e.g., due to detection of excessive number of errors), it may force the link into recovery and initiates a PHY recalibration by writing to the IORecal bit in the PHY's message bus address space. The PHY may acknowledge receipt of the recalibration request by returning a write_ack. After completing the recalibration process, the PHY may signal completion to the controller by writing to the IORecalDone bit in the controller's message bus address space, which the controller acknowledges by return of a write_ack. Upon notification that the recalibration process has completed, the controller can subsequently exit recovery and resume normal operation on the link Turning to FIG. 9B, an example of a PHY-initiated receiver recalibration is shown. For instance, tools may be provided at a PHY block implementation to monitor attributes of the PHY and a link established using the PHY to detect instances where recalibration of the PHY (e.g., a receiver of the PHY) is desirable (e.g., based on detecting that the signal quality as dropped below an acceptable level). For instance, in certain situations, the PHY may identify conditions at the PHY and determine that it needs to be recalibrated, such as changes in operating conditions (e.g., Vref changes) or detection of certain error conditions, among other examples. In response to identifying that a recalibration is desired, the PHY may send a write command 955 on the P2M message bus 910 to cause a value to be written to a recalibration request bit (e.g., PhyIORecalRequest) defined in a message bus register of the MAC and thereby initiate (at 950) receiver calibration. The MAC may detect that the value has been written to this bit (e.g., a 1-cycle register bit) and send an acknowledgement 960 to the PHY using the M2P message bus 905. In some implementations, the PHY may first write this request (at 955) before performing the recalibration, because recalibration is to be performed during a particular link state (e.g., recovery), which is to be initiated using the MAC. For instance, the MAC may initiate the state upon receiving the recalibration request at its message bus register. From this point, in some implementations, the signaling sequence may correspond to that in the controller-initiated recalibration shown and described in FIG. 9A. For instance, the MAC may request recalibration to continue (at 965) by writing a recalibration request 925b to the PHY message bus register (using M2P message bus 905) to indicate that the link is ready for recalibration (e.g., that recovery has been entered). The PHY may acknowledge (through message bus signal 970 on P2M message bus 910) the MAC's recalibration signal 925b and respond by performing the recalibration at the PHY. Upon completion of the recalibration, the PHY may message the same (at 975), by writing 940b to the MAC message bus register using the P2M message bus 910 to indicate that recalibration is completed. The MAC may cause the link to exit recovery based on the PHY's signal and may further send an acknowledgement signal 980 on the M2P message bus 905 to complete the signaling sequence, among other example features and implementations.

To summarize, the example of FIG. 9B illustrates the sequence of transactions seen across the PIPE message bus interface for a PHY-initiated PHY recalibration. For instance, when the PHY detects variations in circuit parameters that warrant a recalibration, it signals to the controller that it should enter recovery and request a PHY recalibration; this is done by writing to the PhyIORecalRequest bit in the controller's message bus address space. The controller acknowledges receipt of this request by returning a write_ack response. The remaining sequence of actions may follow exactly the sequence in the controller-initiated PHY recalibration described above, among other example implementations.

Tables 4 and 5 illustrate an example implementation of message bus registers used to implement signaling on a message bus of a PIPE-based interface to facilitate PHY recalibration requests. For instance, Table 4 illustrates an example implementation of a portion of a MAC-based register utilized for messaging from a PHY to the MAC using a PIPE message bus interface:

TABLE 4

Representation of example MAC Message Bus Registers

| Register | Bit Position | Attribute | Description |
| --- | --- | --- | --- |
| RX Status0 | Bit 1 | 1-cycle | IORecalDone—This field is set to '1' to indicate that an IORecal operation has successfully completed. The PHY advertises in its datasheet via the PhyRecalRequirement parameter whether this functionality is required. |
| RX Control0 | Bit 0 | 1-cycle | PhyIORecalRequest—The PHY sets this to '1' to indicate that the controller should enter Recovery and request a Rx recalibration via the IORecal bit. The PHY advertises in its datasheet via the PhyRecalRequirement parameter whether this functionality is required. |

In the particular example of Table 4, two fields in a MAC message bus register may be defined in order to enable recalibration requests over a message bus interface of a PIPE-based interface. For instance, a PHY-initiated recalibration request signal (PhyIORecalRequest) may be mapped to bit 0 of a receiver control (e.g., Rx Control0) register of the MAC message bus register. When a value of "1" is written to the bit (through a committed write request received from the PHY over the message bus interface), the MAC may read the register and interpret the written value as an Rx recalibration request signal from the PHY. The PhyIORecalRequest bit may be configured to be a 1-cycle assertion type signal. A recalibration done signal (IORecalDone) may also be defined and mapped, in this example, to bit 1 of an Rx Status0 register of the MAC message bus register. A PHY may write a "1" to this bit using the message bus interface (e.g., through a committed write) to indicate to the MAC that Rx recalibration has been completed by the PHY. This signal may also be a 1-cycle assertion type signal field.

In some implementations, a PhyRecalRequirement parameter may be utilized as a parameter, which may be advertised by a PHY block (e.g., in its datasheet, in a capability register or other data structure, from an online source, etc.) whether the corresponding controller (connecting to the PHY over a PIPE-based interface) is required to support the recalibration functionality signaling sequence and related message bus register values (e.g., PhyIORecalRequest, IORecal, and IORecalDone, etc.), among other example information pertaining to requesting and implementing PHY recalibrations.

Table 5 illustrates an example implementation of a portion of a PHY-based register utilized for messaging from a MAC to the PHY using a PIPE message bus interface:

TABLE 5

Representation of example PHY Message Bus Registers

| Register | Bit Position | Attribute | Description |
| --- | --- | --- | --- |
| PHY RX Control1 | 1 | 1-cycle | IORecal—This field is set to '1' to request the PHY to do an RX recalibration followed immediately by a retrain. The controller asserts this signal either in response to PhyIORecalRequest or autonomously if it determines a recalibration is needed. The PHY indicates completion of recalibration via the IORecalDone bit. The PHY advertises in its datasheet via the PhyRecalRequirement parameter whether this functionality is required. |

Table 5 represents a register bit of an example PHY message bus register defined to enable recalibration requests using a PIPE message bus interface. Specifically, in this example, a recalibration request signal (IORecal) may be defined and mapped to bit 1 of a PHY RX Control register of the PHY message bus register. When a value of "1" is written to the bit (through a committed write request received from the MAC over the message bus interface), the PHY may read the register and interpret the written value as an Rx recalibration request signal from the MAC. The IORecal signal may be so sent, for instance, in a MAC-initiated Rx recalibration request or as a response to a PHY-initiated Rx recalibration request (e.g., to confirm that the link is in a state (e.g., recovery) suitable for Rx recalibration to be performed), among other examples. The IORecal bit may be configured to be a 1-cycle assertion type signal.

Figures 10A, 10B:
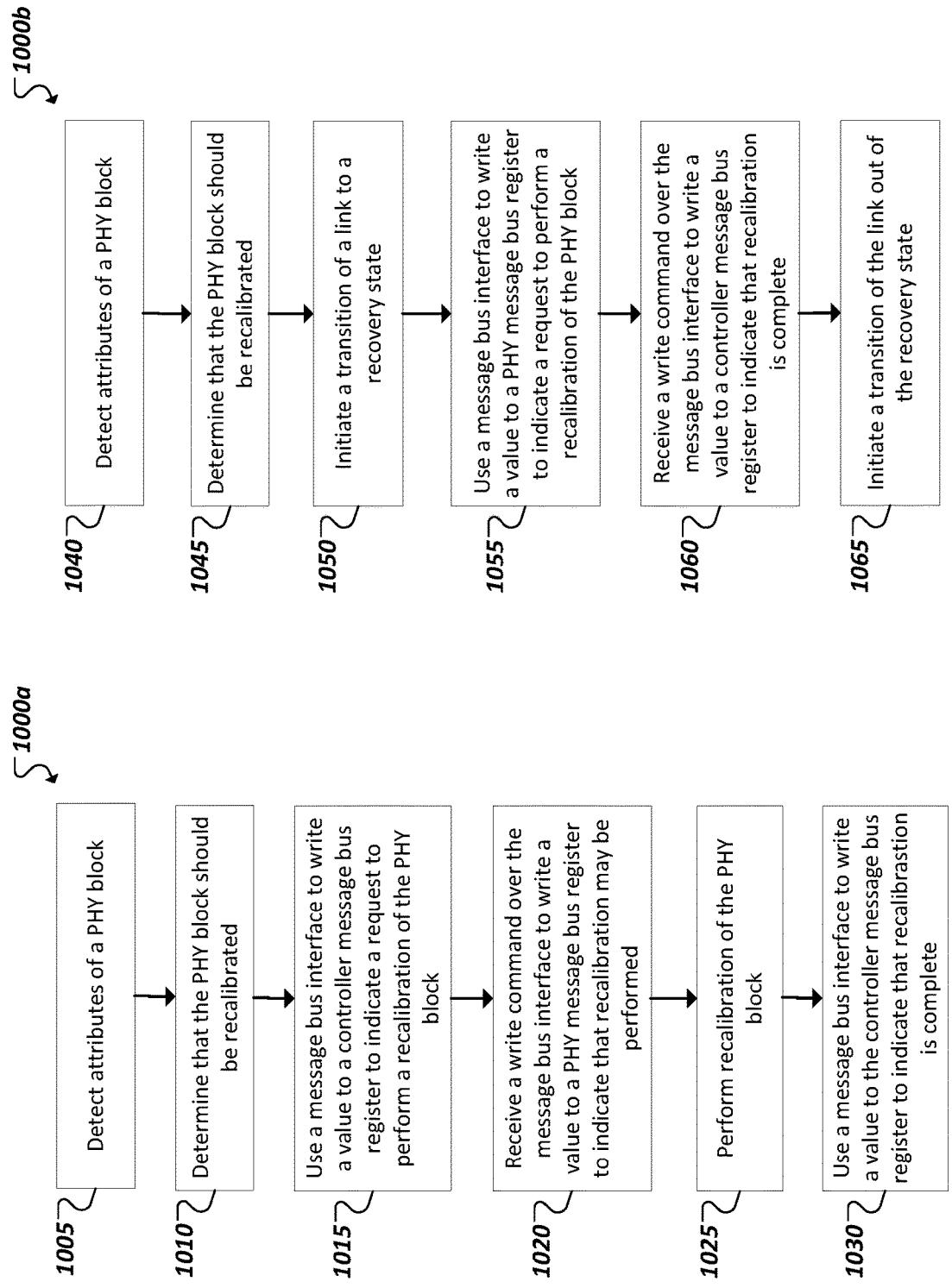
FIGS. 10A-10B are flowcharts illustrating example techniques involving an example PHY/MAC interface.

FIGS. 10A-10B are flowcharts illustrating example procedures corresponding to initiating recalibration through a message bus of an example MAC-PHY interface. For instance, in the example of FIG. 10A, an example of a PHY-initiated recalibration is illustrated. For instance, attributes of the PHY may be detected 1005 (e.g., by detection circuitry on the PHY) and it may be determined 1010 (e.g., at the PHY), based on these attributes or events, that the PHY (e.g., the PHY receiver(s)) should be recalibrated. Accordingly, the PHY may utilize a message bus interface to send a write command 1015 to the controller and write a value to a particular bit in the controller's message bus register mapped to a recalibration request signal. In some implementations, the controller may be responsible for ensuring that a link implemented by the PHY is in a recovery state before the recalibration can continue. Accordingly, a write command may be received 1020 from the MAC over the message bus interface to write a value to a particular bit of a PHY message bus register to indicate a recalibration request/confirmation by the MAC. The PHY may perform 1025 the recalibration (e.g., a PHY Rx recalibration) based on detecting the write to the particular bit in the PHY message bus register. Upon completion of the recalibration, the PHY block may again use the message bus interface to write 1030 a value to another value of the MAC message bus register mapped to a recalibration complete signal, to indicate to the MAC that the recalibration is complete.

Turning to FIG. 10B, an example of a MAC-initiated recalibration is illustrated. For instance, attributes of a PHY block may be detected 1040 (e.g., by the MAC or higher layer logic) and, based on the attributes, it may be determined 1045 that at least a portion (e.g., receiver(s)) of the PHY block should be recalibrated. The MAC may also initiate the transitioning 1050 of a link, implemented using the PHY block, to a recovery state in order to facilitate completion of the recalibration. A message bus interface may be used to write a value 1055 to a particular bit of a PHY message bus interface mapped to a recalibration request signal to indicate a recalibration request to the PHY block. The MAC may receive a write request from the PHY block over the message bus interface to write a value to a particular bit of a MAC message bus register mapped to a recalibration complete signal to indicate that the recalibration has been completed. The MAC may then cause the link to exit 1065 the recovery state and resume communication (e.g., in an active link state) following the recalibration, among other example implementations and features.

Note that the apparatus', methods', and systems described above may be implemented in any electronic device or system as aforementioned. As specific illustrations, the figures below provide exemplary systems for utilizing the invention as described herein. As the systems below are described in more detail, a number of different interconnects are disclosed, described, and revisited from the discussion above. And as is readily apparent, the advances described above may be applied to any of those interconnects, fabrics, or architectures.

Figure 11:
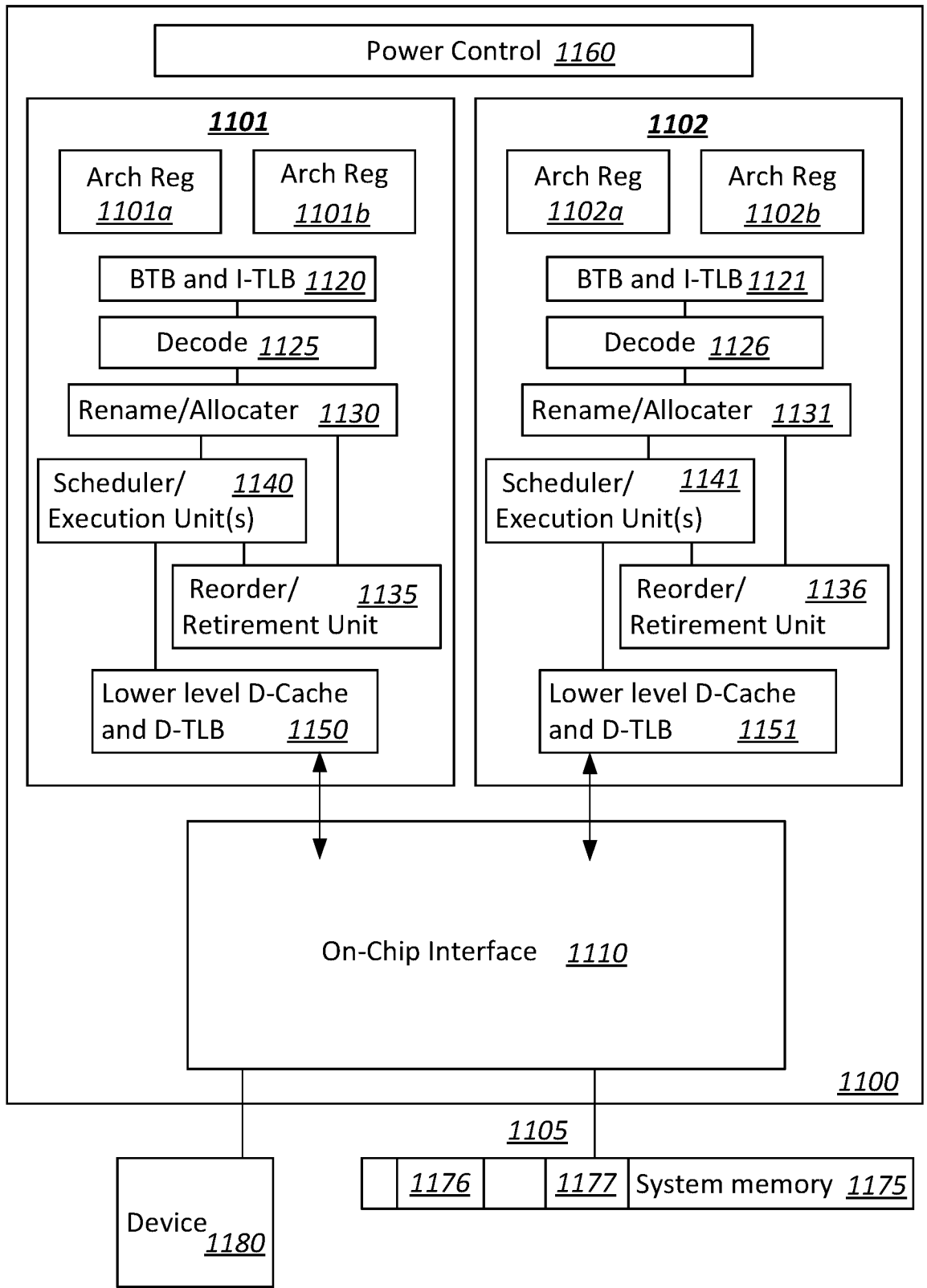
FIG. 11 illustrates an embodiment of a block diagram for a computing system including a multicore processor.

Referring to FIG. 11, an embodiment of a block diagram for a computing system including a multicore processor is depicted. Processor 1100 includes any processor or processing device, such as a microprocessor, an embedded processor, a digital signal processor (DSP), a network processor, a handheld processor, an application processor, a co-processor, a system on a chip (SOC), or other device to execute code. Processor 1100, in one embodiment, includes at least two cores—core 1101 and 1102, which may include asymmetric cores or symmetric cores (the illustrated embodiment). However, processor 1100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1100, as illustrated in FIG. 11, includes two cores—core 1101 and 1102. Here, core 1101 and 1102 are considered symmetric cores, i.e. cores with the same configurations, functional units, and/or logic. In another embodiment, core 1101 includes an out-of-order processor core, while core 1102 includes an in-order processor core. However, cores 1101 and 1102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such as a binary translation, may be utilized to schedule or execute code on one or both cores. Yet to further the discussion, the functional units illustrated in core 1101 are described in further detail below, as the units in core 1102 operate in a similar manner in the depicted embodiment.

As depicted, core 1101 includes two hardware threads 1101a and 1101b, which may also be referred to as hardware thread slots 1101a and 1101b. Therefore, software entities, such as an operating system, in one embodiment potentially view processor 1100 as four separate processors, i.e., four logical processors or processing elements capable of executing four software threads concurrently. As alluded to above, a first thread is associated with architecture state registers 1101a, a second thread is associated with architecture state registers 1101b, a third thread may be associated with architecture state registers 1102a, and a fourth thread may be associated with architecture state registers 1102b. Here, each of the architecture state registers (1101a, 1101b, 1102a, and 1102b) may be referred to as processing elements, thread slots, or thread units, as described above. As illustrated, architecture state registers 1101a are replicated in architecture state registers 1101b, so individual architecture states/contexts are capable of being stored for logical processor 1101a and logical processor 1101b. In core 1101, other smaller resources, such as instruction pointers and renaming logic in allocator and renamer block 1130 may also be replicated for threads 1101a and 1101b. Some resources, such as re-order buffers in reorder/retirement unit 1135, ILTB 1120, load/store buffers, and queues may be shared through partitioning. Other resources, such as general purpose internal registers, page-table base register(s), low-level data-cache and data-TLB 1115, execution unit(s) 1140, and portions of out-of-order unit 1135 are potentially fully shared.

Processor 1100 often includes other resources, which may be fully shared, shared through partitioning, or dedicated by/to processing elements. In FIG. 11, an embodiment of a purely exemplary processor with illustrative logical units/resources of a processor is illustrated. Note that a processor may include, or omit, any of these functional units, as well as include any other known functional units, logic, or firmware not depicted. As illustrated, core 1101 includes a simplified, representative out-of-order (OOO) processor core. But an in-order processor may be utilized in different embodiments. The OOO core includes a branch target buffer 1120 to predict branches to be executed/taken and an instruction-translation buffer (I-TLB) 1120 to store address translation entries for instructions.

Core 1101 further includes decode module 1125 coupled to fetch unit 1120 to decode fetched elements. Fetch logic, in one embodiment, includes individual sequencers associated with thread slots 1101a, 1101b, respectively. Usually core 1101 is associated with a first ISA, which defines/specifies instructions executable on processor 1100. Often machine code instructions that are part of the first ISA include a portion of the instruction (referred to as an opcode), which references/specifies an instruction or operation to be performed. Decode logic 1125 includes circuitry that recognizes these instructions from their opcodes and passes the decoded instructions on in the pipeline for processing as defined by the first ISA. For example, as discussed in more detail below decoders 1125, in one embodiment, include logic designed or adapted to recognize specific instructions, such as transactional instruction. As a result of the recognition by decoders 1125, the architecture or core 1101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 1126, in one embodiment, recognize the same ISA (or a subset thereof). Alternatively, in a heterogeneous core environment, decoders 1126 recognize a second ISA (either a subset of the first ISA or a distinct ISA).

In one example, allocator and renamer block 1130 includes an allocator to reserve resources, such as register files to store instruction processing results. However, threads 1101a and 1101b are potentially capable of out-of-order execution, where allocator and renamer block 1430 also reserves other resources, such as reorder buffers to track instruction results. Unit 1130 may also include a register renamer to rename program/instruction reference registers to other registers internal to processor 1100. Reorder/retirement unit 1135 includes components, such as the reorder buffers mentioned above, load buffers, and store buffers, to support out-of-order execution and later in-order retirement of instructions executed out-of-order.

Scheduler and execution unit(s) block 1140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1150 are coupled to execution unit(s) 1140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1101 and 1102 share access to higher-level or further-out cache, such as a second level cache associated with on-chip interface 1110. Note that higher-level or further-out refers to cache levels increasing or getting further way from the execution unit(s). In one embodiment, higher-level cache is a last-level data cache—last cache in the memory hierarchy on processor 1100—such as a second or third level data cache. However, higher level cache is not so limited, as it may be associated with or include an instruction cache. A trace cache—a type of instruction cache—instead may be coupled after decoder 1125 to store recently decoded traces. Here, an instruction potentially refers to a macro-instruction (i.e. a general instruction recognized by the decoders), which may decode into a number of micro-instructions (micro-operations).

In the depicted configuration, processor 1100 also includes on-chip interface module 1110. Historically, a memory controller, which is described in more detail below, has been included in a computing system external to processor 1100. In this scenario, on-chip interface 1110 is to communicate with devices external to processor 1100, such as system memory 1175, a chipset (often including a memory controller hub to connect to memory 1175 and an I/O controller hub to connect peripheral devices), a memory controller hub, a northbridge, or other integrated circuit. And in this scenario, bus 1105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1175 may be dedicated to processor 1100 or shared with other devices in a system. Common examples of types of memory 1175 include DRAM, SRAM, non-volatile memory (NV memory), and other known storage devices. Note that device 1180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 1100. For example, in one embodiment, a memory controller hub is on the same package and/or die with processor 1100. Here, a portion of the core (an on-core portion) 1110 includes one or more controller(s) for interfacing with other devices such as memory 1175 or a graphics device 1180. The configuration including an interconnect and controllers for interfacing with such devices is often referred to as an on-core (or un-core configuration). As an example, on-chip interface 1110 includes a ring interconnect for on-chip communication and a high-speed serial point-to-point link 1105 for off-chip communication. Yet, in the SOC environment, even more devices, such as the network interface, co-processors, memory 1175, graphics processor 1180, and any other known computer devices/interface may be integrated on a single die or integrated circuit to provide small form factor with high functionality and low power consumption.

In one embodiment, processor 1100 is capable of executing a compiler, optimization, and/or translator code 1177 to compile, translate, and/or optimize application code 1176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 12:
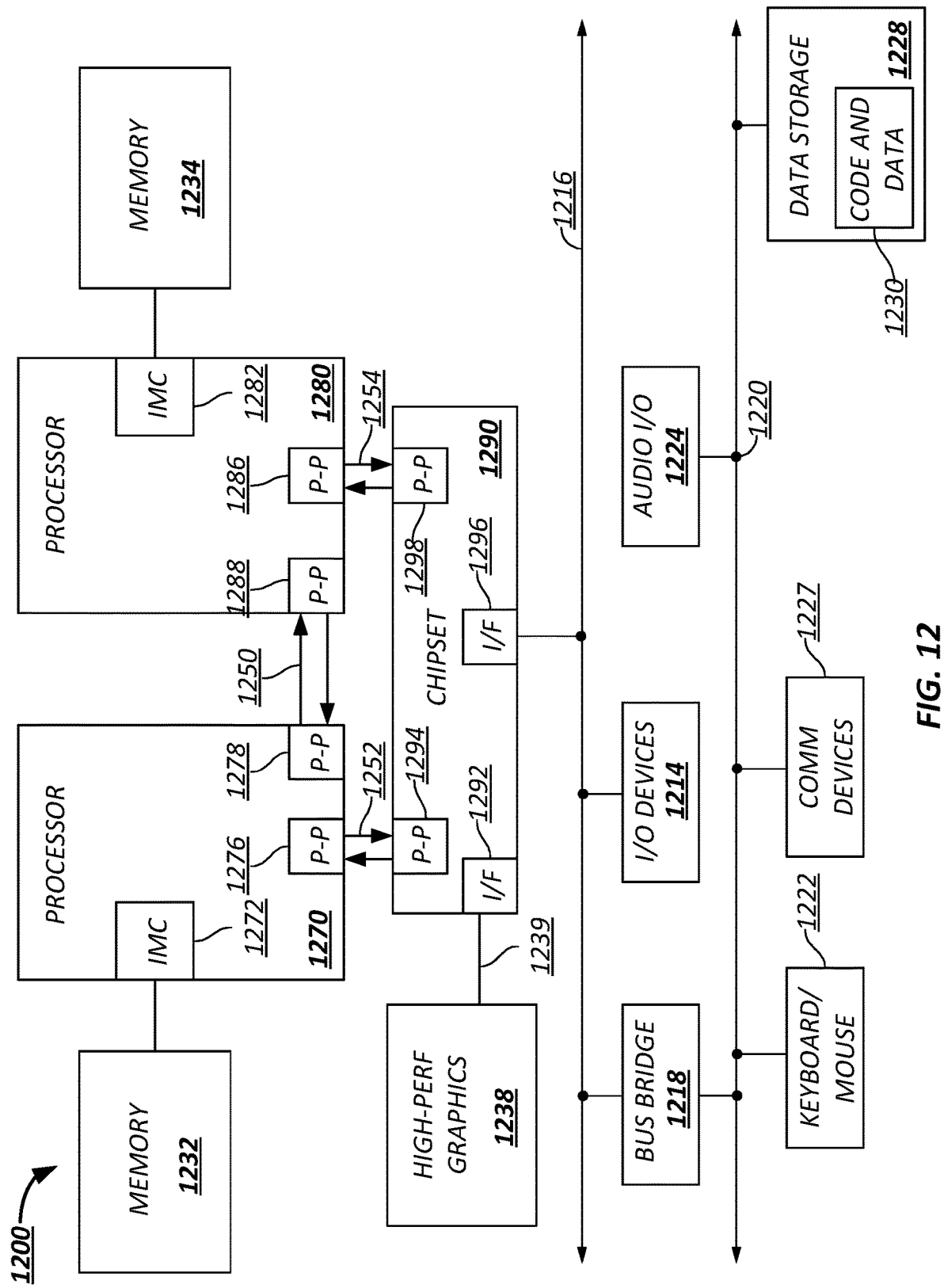
FIG. 12 illustrates another embodiment of a block diagram for a computing system.

Referring now to FIG. 12, shown is a block diagram of a second system 1200 in accordance with an embodiment of the present invention. As shown in FIG. 12, multiprocessor system 1200 is a point-to-point interconnect system, and includes a first processor 1270 and a second processor 1280 coupled via a point-to-point interconnect 1250. Each of processors 1270 and 1280 may be some version of a processor. In one embodiment, 1252 and 1254 are part of a serial, point-to-point coherent interconnect fabric, such as Intel's Quick Path Interconnect (QPI) architecture. As a result, the invention may be implemented within the QPI architecture.

While shown with only two processors 1270, 1280, it is to be understood that the scope of the present invention is not so limited. In other embodiments, one or more additional processors may be present in a given processor.

Processors 1270 and 1280 are shown including integrated memory controller units 1272 and 1282, respectively. Processor 1270 also includes as part of its bus controller units point-to-point (P-P) interfaces 1276 and 1278; similarly, second processor 1280 includes P-P interfaces 1286 and 1288. Processors 1270, 1280 may exchange information via a point-to-point (P-P) interface 1250 using P-P interface circuits 1278, 1288. As shown in FIG. 12, IMCs 1272 and 1282 couple the processors to respective memories, namely a memory 1232 and a memory 1234, which may be portions of main memory locally attached to the respective processors.

Processors 1270, 1280 each exchange information with a chipset 1290 via individual P-P interfaces 1252, 1254 using point to point interface circuits 1276, 1294, 1286, 1298. Chipset 1290 also exchanges information with a high-performance graphics circuit 1238 via an interface circuit 1292 along a high-performance graphics interconnect 1239.

A shared cache (not shown) may be included in either processor or outside of both processors; yet connected with the processors via P-P interconnect, such that either or both processors' local cache information may be stored in the shared cache if a processor is placed into a low power mode.

Chipset 1290 may be coupled to a first bus 1216 via an interface 1296. In one embodiment, first bus 1216 may be a Peripheral Component Interconnect (PCI) bus, or a bus such as a PCI Express bus or another third generation I/O interconnect bus, although the scope of the present invention is not so limited.

As shown in FIG. 12, various I/O devices 1214 are coupled to first bus 1216, along with a bus bridge 1218 which couples first bus 1216 to a second bus 1220. In one embodiment, second bus 1220 includes a low pin count (LPC) bus. Various devices are coupled to second bus 1220 including, for example, a keyboard and/or mouse 1222, communication devices 1227 and a storage unit 1228 such as a disk drive or other mass storage device which often includes instructions/code and data 1230, in one embodiment. Further, an audio I/O 1224 is shown coupled to second bus 1220. Note that other architectures are possible, where the included components and interconnect architectures vary. For example, instead of the point-to-point architecture of FIG. 12, a system may implement a multi-drop bus or other such architecture.

Computing systems can include various combinations of components. These components may be implemented as ICs, portions thereof, discrete electronic devices, or other modules, logic, hardware, software, firmware, or a combination thereof adapted in a computer system, or as components otherwise incorporated within a chassis of the computer system. However, it is to be understood that some of the components shown may be omitted, additional components may be present, and different arrangement of the components shown may occur in other implementations. As a result, the invention described above may be implemented in any portion of one or more of the interconnects illustrated or described below.

A processor, in one embodiment, includes a microprocessor, multi-core processor, multithreaded processor, an ultra-low voltage processor, an embedded processor, or other known processing element. In the illustrated implementation, processor acts as a main processing unit and central hub for communication with many of the various components of the system. As one example, processor is implemented as a system on a chip (SoC). As a specific illustrative example, processor includes an Intel® Architecture Core™-based processor such as an i3, i5, i7 or another such processor available from Intel Corporation, Santa Clara, Calif. However, understand that other low power processors such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters may instead be present in other embodiments such as an Apple A5/A6 processor, a Qualcomm Snapdragon processor, or TI OMAP processor. Note that many of the customer versions of such processors are modified and varied; however, they may support or recognize a specific instruction set that performs defined algorithms as set forth by the processor licensor. Here, the microarchitectural implementation may vary, but the architectural function of the processor is usually consistent. Certain details regarding the architecture and operation of processor in one implementation will be discussed further below to provide an illustrative example.

Processor, in one embodiment, communicates with a system memory. As an illustrative example, which in an embodiment can be implemented via multiple memory devices to provide for a given amount of system memory. As examples, the memory can be in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard to be referred to as LPDDR3 or LPDDR4 that will offer extensions to LPDDR2 to increase bandwidth. In various implementations the individual memory devices may be of different package types such as single die package (SDP), dual die package (DDP) or quad die package (13P). These devices, in some embodiments, are directly soldered onto a motherboard to provide a lower profile solution, while in other embodiments the devices are configured as one or more memory modules that in turn couple to the motherboard by a given connector. And of course, other memory implementations are possible such as other types of memory modules, e.g., dual inline memory modules (DIMMs) of different varieties including but not limited to microDIMMs, MiniDIMMs. In a particular illustrative embodiment, memory is sized between 2 GB and 16 GB, and may be configured as a DDR3LM package or an LPDDR2 or LPDDR3 memory that is soldered onto a motherboard via a ball grid array (BGA).

To provide for persistent storage of information such as data, applications, one or more operating systems and so forth, a mass storage may also couple to processor. In various embodiments, to enable a thinner and lighter system design as well as to improve system responsiveness, this mass storage may be implemented via an SSD. However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. A flash device may be coupled to processor, e.g., via a serial peripheral interface (SPI). This flash device may provide for non-volatile storage of system software, including a basic input/output software (BIOS) as well as other firmware of the system.

In various embodiments, mass storage of the system is implemented by an SSD alone or as a disk, optical or other drive with an SSD cache. In some embodiments, the mass storage is implemented as an SSD or as an HDD along with a restore (RST) cache module. In various implementations, the HDD provides for storage of between 320 GB-4 terabytes (TB) and upward while the RST cache is implemented with an SSD having a capacity of 24 GB-256 GB. Note that such SSD cache may be configured as a single level cache (SLC) or multi-level cache (MLC) option to provide an appropriate level of responsiveness. In an SSD-only option, the module may be accommodated in various locations such as in a mSATA or NGFF slot. As an example, an SSD has a capacity ranging from 120 GB-1 TB.

Various peripheral devices may couple to processor via a low pin count (LPC) interconnect. In the embodiment shown, various components can be coupled through an embedded controller. Such components can include a keyboard (e.g., coupled via a PS2 interface), a fan, and a thermal sensor. In some embodiments, touch pad may also couple to EC via a PS2 interface. In addition, a security processor such as a trusted platform module (TPM) in accordance with the Trusted Computing Group (TCG) TPM Specification Version 1.2, dated Oct. 2, 2003, may also couple to processor via this LPC interconnect. However, understand the scope of the present invention is not limited in this regard and secure processing and storage of secure information may be in another protected location such as a static random access memory (SRAM) in a security coprocessor, or as encrypted data blobs that are only decrypted when protected by a secure enclave (SE) processor mode.

In a particular implementation, peripheral ports may include a high definition media interface (HDMI) connector (which can be of different form factors such as full size, mini or micro); one or more USB ports, such as full-size external ports in accordance with the Universal Serial Bus Revision 3.0 Specification (November 2008), with at least one powered for charging of USB devices (such as smartphones) when the system is in Connected Standby state and is plugged into AC wall power. In addition, one or more Thunderbolt™ ports can be provided. Other ports may include an externally accessible card reader such as a full-size SD-XC card reader and/or a SIM card reader for WWAN (e.g., an 8-pin card reader). For audio, a 3.5 mm jack with stereo sound and microphone capability (e.g., combination functionality) can be present, with support for jack detection (e.g., headphone only support using microphone in the lid or headphone with microphone in cable). In some embodiments, this jack can be re-taskable between stereo headphone and stereo microphone input. Also, a power jack can be provided for coupling to an AC brick.

System can communicate with external devices in a variety of manners, including wirelessly. In some instances, various wireless modules, each of which can correspond to a radio configured for a particular wireless communication protocol, are present. One manner for wireless communication in a short range such as a near field may be via a near field communication (NFC) unit which may communicate, in one embodiment with processor via an SMBus. Note that via this NFC unit, devices in close proximity to each other can communicate. For example, a user can enable system to communicate with another (e.g.,) portable device such as a smartphone of the user via adapting the two devices together in close relation and enabling transfer of information such as identification information payment information, data such as image data or so forth. Wireless power transfer may also be performed using an NFC system.

Using the NFC unit described herein, users can bump devices side-to-side and place devices side-by-side for near field coupling functions (such as near field communication and wireless power transfer (WPT)) by leveraging the coupling between coils of one or more of such devices. More specifically, embodiments provide devices with strategically shaped, and placed, ferrite materials, to provide for better coupling of the coils. Each coil has an inductance associated with it, which can be chosen in conjunction with the resistive, capacitive, and other features of the system to enable a common resonant frequency for the system.

Further, additional wireless units can include other short-range wireless engines including a WLAN unit and a Bluetooth unit. Using WLAN unit, Wi-Fi™ communications in accordance with a given Institute of Electrical and Electronics Engineers (IEEE) 802.11 standard can be realized, while via Bluetooth unit, short range communications via a Bluetooth protocol can occur. These units may communicate with processor via, e.g., a USB link or a universal asynchronous receiver transmitter (UART) link. Or these units may couple to processor via an interconnect according to a Peripheral Component Interconnect Express™ (PCIe™) protocol, e.g., in accordance with the PCI Express™ Specification Base Specification version 3.0 (published Jan. 17, 2007), or another such protocol such as a serial data input/output (SDIO) standard. Of course, the actual physical connection between these peripheral devices, which may be configured on one or more add-in cards, can be by way of the NGFF connectors adapted to a motherboard.

In addition, wireless wide area communications, e.g., according to a cellular or other wireless wide area protocol, can occur via a WWAN unit which in turn may couple to a subscriber identity module (SIM). In addition, to enable receipt and use of location information, a GPS module may also be present. WWAN unit and an integrated capture device such as a camera module may communicate via a given USB protocol such as a USB 2.0 or 3.0 link, or a UART or I²C protocol. Again, the actual physical connection of these units can be via adaptation of a NGFF add-in card to an NGFF connector configured on the motherboard.

In a particular embodiment, wireless functionality can be provided modularly, e.g., with a WiFi™ 802.11ac solution (e.g., add-in card that is backward compatible with IEEE 802.11abgn) with support for Windows 8 CS. This card can be configured in an internal slot (e.g., via an NGFF adapter). An additional module may provide for Bluetooth capability (e.g., Bluetooth 4.0 with backwards compatibility) as well as Intel® Wireless Display functionality. In addition, NFC support may be provided via a separate device or multifunction device, and can be positioned as an example, in a front right portion of the chassis for easy access. A still additional module may be a WWAN device that can provide support for 3G/4G/LTE and GPS. This module can be implemented in an internal (e.g., NGFF) slot. Integrated antenna support can be provided for WiFi™, Bluetooth, WWAN, NFC and GPS, enabling seamless transition from WiFi™ to WWAN radios, wireless gigabit (WiGig) in accordance with the Wireless Gigabit Specification (July 2010), and vice versa.

As described above, an integrated camera can be incorporated in the lid. As one example, this camera can be a high-resolution camera, e.g., having a resolution of at least 2.0 megapixels (MP) and extending to 6.0 MP and beyond.

To provide for audio inputs and outputs, an audio processor can be implemented via a digital signal processor (DSP), which may couple to processor via a high definition audio (HDA) link. Similarly, DSP may communicate with an integrated coder/decoder (CODEC) and amplifier that in turn may couple to output speakers which may be implemented within the chassis. Similarly, amplifier and CODEC can be coupled to receive audio inputs from a microphone which in an embodiment can be implemented via dual array microphones (such as a digital microphone array) to provide for high quality audio inputs to enable voice-activated control of various operations within the system. Note also that audio outputs can be provided from amplifier/CODEC to a headphone jack.

In a particular embodiment, the digital audio codec and amplifier are capable of driving the stereo headphone jack, stereo microphone jack, an internal microphone array and stereo speakers. In different implementations, the codec can be integrated into an audio DSP or coupled via an HD audio path to a peripheral controller hub (PCH). In some implementations, in addition to integrated stereo speakers, one or more bass speakers can be provided, and the speaker solution can support DTS audio.

In some embodiments, processor may be powered by an external voltage regulator (VR) and multiple internal voltage regulators that are integrated inside the processor die, referred to as fully integrated voltage regulators (FIVRs). The use of multiple FIVRs in the processor enables the grouping of components into separate power planes, such that power is regulated and supplied by the FIVR to only those components in the group. During power management, a given power plane of one FIVR may be powered down or off when the processor is placed into a certain low power state, while another power plane of another FIVR remains active, or fully powered.

In one embodiment, a sustain power plane can be used during some deep sleep states to power on the I/O pins for several I/O signals, such as the interface between the processor and a PCH, the interface with the external VR and the interface with EC. This sustain power plane also powers an on-die voltage regulator that supports the on-board SRAM or other cache memory in which the processor context is stored during the sleep state. The sustain power plane is also used to power on the processor's wakeup logic that monitors and processes the various wakeup source signals.

During power management, while other power planes are powered down or off when the processor enters certain deep sleep states, the sustain power plane remains powered on to support the above-referenced components. However, this can lead to unnecessary power consumption or dissipation when those components are not needed. To this end, embodiments may provide a connected standby sleep state to maintain processor context using a dedicated power plane. In one embodiment, the connected standby sleep state facilitates processor wakeup using resources of a PCH which itself may be present in a package with the processor. In one embodiment, the connected standby sleep state facilitates sustaining processor architectural functions in the PCH until processor wakeup, this enabling turning off all of the unnecessary processor components that were previously left powered on during deep sleep states, including turning off all of the clocks. In one embodiment, the PCH contains a time stamp counter (TSC) and connected standby logic for controlling the system during the connected standby state. The integrated voltage regulator for the sustain power plane may reside on the PCH as well.

In an embodiment, during the connected standby state, an integrated voltage regulator may function as a dedicated power plane that remains powered on to support the dedicated cache memory in which the processor context is stored such as critical state variables when the processor enters the deep sleep states and connected standby state. This critical state may include state variables associated with the architectural, micro-architectural, debug state, and/or similar state variables associated with the processor.

The wakeup source signals from EC may be sent to the PCH instead of the processor during the connected standby state so that the PCH can manage the wakeup processing instead of the processor. In addition, the TSC is maintained in the PCH to facilitate sustaining processor architectural functions.

Power control in the processor can lead to enhanced power savings. For example, power can be dynamically allocated between cores, individual cores can change frequency/voltage, and multiple deep low power states can be provided to enable very low power consumption. In addition, dynamic control of the cores or independent core portions can provide for reduced power consumption by powering off components when they are not being used.

In different implementations, a security module such as a TPM can be integrated into a processor or can be a discrete device such as a TPM 2.0 device. With an integrated security module, also referred to as Platform Trust Technology (PTT), BIOS/firmware can be enabled to expose certain hardware features for certain security features, including secure instructions, secure boot, Intel® Anti-Theft Technology, Intel® Identity Protection Technology, Intel® Trusted Execution Technology (TXT), and Intel® Manageability Engine Technology along with secure user interfaces such as a secure keyboard and display.

While the present invention has been described with respect to a limited number of embodiments, those skilled in the art will appreciate numerous modifications and variations therefrom. It is intended that the appended claims cover all such modifications and variations as fall within the true spirit and scope of this present invention.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example, the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The following examples pertain to embodiments in accordance with this Specification. Example 1 is an apparatus including: physical layer (PHY) circuitry; a memory to implement a message bus register, where a set of control and status signals are mapped to bits of the message bus register, and the set of control and status signals includes a recalibration request signal mapped to a particular one of the bits of the message bus register; and an interface to couple to a controller, where the interface includes a PHY Interface for the PCI Express (PIPE)-based interface, and the interface includes: a set of data pins including transmit data pins to send data to the controller and receive data pins to receive data from the controller; a particular set of pins to implement a message bus interface, where a write command is to be received from the controller over the message bus interface to write a value to the particular bit; and recalibration circuitry to perform a recalibration of the PHY circuitry based on the value written to the particular bit.

Example 2 includes the subject matter of example 1, where the write command includes a committed write.

Example 3 includes the subject matter of any one of examples 1-2, where the value of the particular bit is to be reset automatically after a number of clock cycles.

Example 4 includes the subject matter of any one of examples 1-3, further including detection circuitry to: detect one or more attributes of the PHY circuitry; and determine that the recalibration should be performed based on the one or more attributes.

Example 5 includes the subject matter of example 4, where the PHY circuitry is to send a write command to the controller over the message bus interface to write a value to a message bus register of the controller to indicate to the controller a request to perform the recalibration.

Example 6 includes the subject matter of example 5, where the write command from the controller is received based on the request to perform the recalibration.

Example 7 includes the subject matter of example 6, where the PHY circuitry is to implement a link and the recalibration is to be performed while the link is in recovery, where the controller is to initiate the recovery.

Example 8 includes the subject matter of any one of examples 1-7, where the PHY circuitry is to send a write command to the controller over the message bus interface to write a value to a message bus register of the controller to indicate to the controller that the recalibration is complete.

Example 9 includes the subject matter of any one of examples 1-8, where the PIPE-based interface includes a PHY Interface for PCI Express, SATA, DisplayPort, and Converged IO Architectures.

Example 10 is an apparatus including: a controller; and an interface to couple the controller to a physical layer (PHY) block, where the interface includes: a set of data pins including transmit data pins to send data to the PHY block and receive data pins to receive data from the PHY block; and a particular set of pins to implement a message bus interface, where the controller is to send a write command to the PHY block over the message bus interface to write a value to at least one particular bit of a PHY message bus register, bits of the PHY message bus register are mapped to a set of control and status signals, and the particular bit is mapped to a recalibration request signal to request that the PHY block perform a recalibration.

Example 11 includes the subject matter of example 10, where the set of control and status signals includes a first set of control and status signals, and the apparatus further includes a memory to implement a controller message bus register, where bits of the controller message bus register are mapped to a second set of control and status signals, and the controller is to receive commands from the PHY block over the message bus interface to set values of bits in the controller message bus register to indicate particular signals in the second set of control and status signals.

Example 12 includes the subject matter of example 11, where the second set of control and status signals includes a recalibration complete signal mapped to a particular one of the bits of the controller message bus register to indicate completion of the recalibration by the PHY block.

Example 13 includes the subject matter of example 11, where the second set of control and status signals includes a PHY-initiated recalibration request signal mapped to a particular one of the bits of the controller message bus register to initiate the recalibration by the PHY block.

Example 14 includes the subject matter of example 13, where the recalibration is to be performed while a link is in recovery, the controller is to initiate transition of the link to recovery, and the PHY-initiated recalibration request signal is to request the controller to initiate the transition of the link to recovery.

Example 15 includes the subject matter of example 13, where the second set of control and status signals further includes a recalibration complete signal mapped to another one of the bits of the controller message bus register to indicate completion of the recalibration by the PHY block.

Example 16 includes the subject matter of any one of examples 10-15, where the interface includes a PHY Interface for the PCI Express (PIPE)-based interface.

Example 17 includes the subject matter of any one of examples 10-16, where the controller includes a media access controller (MAC).

Example 18 includes the subject matter of any one of examples 10-17, where the write command includes a committed write.

Example 19 includes the subject matter of any one of examples 1-18, where the value of the particular bit is to be reset automatically after a number of clock cycles.

Example 20 includes the subject matter of any one of examples 1-19, where the PIPE-based interface includes a PHY Interface for PCI Express, SATA, DisplayPort, and Converged IO Architectures.

Example 21 is a system including: a first device including a media access controller (MAC) circuitry; a second device including physical layer (PHY) circuitry, where the second device includes a PHY message bus register, bits of the PHY message bus register are mapped to a set of control and status signals, and a particular one of the bits of the PHY message bus register is mapped to a recalibration request signal; an interface to couple the first device to the second device, where the interface includes: a first pins to enable signaling of data from the first device to the second device; second pins to enable signaling of data from the second device to the first device; third pins to implement a message bus interface, where the first device is to send a write request to the second device over the message bus interface to write a value to the particular bit and indicate a request to perform a recalibration of the PHY circuitry, where the second device further includes recalibration circuitry to perform the recalibration based on writing the value to the particular bit.

Example 22 includes the subject matter of example 21, where the set of control and status signals include a second set of control and status signals, the first device includes a controller message bus register, bits of the controller message bus register are mapped to a first set of control and status signals, a particular bit of the controller message bus register is mapped to a PHY-initiated recalibration request signal, and another bit of the controller message bus register is mapped to a recalibration complete signal.

Example 23 includes the subject matter of example 21, where the interface includes a PHY Interface for PCI Express, SATA, DisplayPort, and Converged IO Architectures.

Example 24 is a method including: receiving, over a message bus of a Physical Layer (PHY) Interface for the Peripheral Interconnect Express (PIPE)-based interface, a first write request from a controller, where the first write request is to set a value of a particular bit of a PHY message bus register, bits of the PHY message bus register are mapped to a first set of control and status signals, the PIPE-based interface couples the controller to a PHY block, and the particular bit is mapped to a recalibration request signal in the first set of control and status signals; performing a recalibration of at least a portion of the PHY block based on setting the value of the particular bit; and sending, over the message bus interface, a second write request to the controller, where the second write request is to set a value of a particular bit of a controller message bus register to indicate completion of the recalibration, where bits in the controller message bus register are mapped to a second set of control and status signals.

Example 25 includes the subject matter of example 24, where at least one of the first write and the second write includes a committed write.

Example 26 includes the subject matter of any one of examples 24-25, where the value of the particular bit of at least one of the PHY message bus register and the controller message bus register is to be reset automatically after a number of clock cycles.

Example 27 includes the subject matter of any one of examples 24-26, further including: detecting one or more attributes of the PHY block; and determining that the recalibration should be performed based on the one or more attributes.

Example 28 includes the subject matter of example 27, further including sending, over the message bus interface, another write request to the controller to write a value to another bits of the controller message bus register to indicate to the controller a request to perform the recalibration.

Example 29 includes the subject matter of example 28, where the first write command is received from the controller based on the request to perform the recalibration.

Example 30 includes the subject matter of any one of examples 24-29, where the PHY block is to implement a link and the recalibration is to be performed while the link is in recovery, where the controller is to initiate the recovery.

Example 31 includes the subject matter of any one of examples 24-30, where the PIPE-based interface includes a PHY Interface for PCI Express, SATA, DisplayPort, and Converged IO Architectures.

Example 32 is a system including means to perform the method of any one of examples 24-31.

Example 33 is a method including: detecting one or more attributes of a physical layer (PHY) block; determining that at least a portion of the PHY block should be recalibrated based on the one or more attributes; and sending a first write request over a message bus of a PHY Interface for the Peripheral Interconnect Express (PIPE)-based interface, where the first write request is to set a value of a particular bit of a PHY message bus register, bits of the PHY message bus register are mapped to a first set of control and status signals, the PIPE-based interface couples a controller to the PHY block, and the particular bit is mapped to a recalibration request signal in the first set of control and status signals.

Example 34 includes the subject matter of example 33, further including receiving, over the message bus interface, a second write request to the controller, where the second write request is to set a value of a particular bit of a controller message bus register to indicate completion of the recalibration, where bits in the controller message bus register are mapped to a second set of control and status signals.

Example 35 includes the subject matter of any one of examples 33-34, where the recalibration is to be performed while a link is in recovery, and the method further includes initiating transition of the link to recovery.

Example 36 includes the subject matter of any one of examples 33-35, further including receiving, over the message bus interface, another write request to the controller, where the other write request is to set a value of a defined bit of a controller message bus register to indicate a recalibration request, where the first write request is sent based on identifying that the value of the defined bit is set.

Example 37 includes the subject matter of any one of examples 33-36, where the interface includes a PHY Interface for the PCI Express (PIPE)-based interface.

Example 38 includes the subject matter of any one of examples 33-37, where the controller includes a media access controller (MAC).

Example 39 includes the subject matter of any one of examples 33-38, where the write command includes a committed write.

Example 40 includes the subject matter of any one of examples 33-39, where the value of the particular bit is to be reset automatically after a number of clock cycles.

Example 41 includes the subject matter of any one of examples 33-40, where the PIPE-based interface includes a PHY Interface for PCI Express, SATA, DisplayPort, and Converged IO Architectures.

Example 42 is a system including means to perform the method of any one of examples 33-41.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc, which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A method comprising:
   receiving a request to recalibrate a receiver by a physical layer (PHY) block via a message bus portion of an interface with a media access (MAC) block;
   sending an acknowledgment of the request to recalibrate via the message bus portion of the interface;
   recalibrating the receiver in response to the request; and
   sending a completion message via the message bus portion of the interface after the recalibrating is completed.

2. The method of claim 1, wherein the request to recalibrate is a write to an I/O recalibration bit in a register in the PHY block.

3. The method of claim 1, wherein the completion message is a write to an I/O recalibration done bit in a register in the MAC block.

4. The method of claim 1, further comprising sending a PHY initiated recalibration request by the PHY block via the message bus portion of the interface before receiving the request to recalibrate the receiver.

5. The method of claim 1, wherein the PHY initiated recalibration request is a write to an I/O recalibration request bit in a register in the MAC block.

6. The method of claim 1, wherein the interface is a PHY Interface for PCI Express (PIPE)-based interface.

7. An apparatus comprising:
    physical layer (PHY) circuitry, including:
        a register to store a bit of data, and
        recalibration circuitry to recalibrate a PHY receiver based on a value of the bit in the register; and
    an interface to couple the PHY circuitry to media access (MAC) circuitry, the interface including:
        a message bus interface to receive a recalibration request from the MAC circuitry to write the bit of data to the register.

8. The apparatus of claim 7, wherein the PHY circuitry is further arranged to send a completion message via the message bus interface to write a bit to a register in the MAC circuitry after the PHY receiver has been recalibrated by the recalibration circuitry.

9. The apparatus of claim 7, wherein the PHY circuitry is further arranged to send a PHY initiated recalibration request via the message bus interface to write a bit to a register in the MAC circuitry when the PHY circuitry determines a need for recalibration of the PHY receiver.

10. The apparatus of claim 7, wherein the interface is a PHY Interface for PCI Express (PIPE)-based interface.

11. A system comprising:
    physical layer (PHY) circuitry comprising:
        a register to store a bit of data, and
        recalibration circuitry to recalibrate a PHY receiver based on a value of the bit in the register; and
    media access (MAC) circuitry coupled to the PHY circuitry by a defined interface, wherein the defined interface comprises a message bus interface, the MAC circuitry is to send a recalibration request to the PHY circuitry via the defined interface to write the value to the bit in the register.

12. The system of claim 11, wherein the defined interface comprises a plurality of dedicated pins, and the message interface comprises a subset of the plurality of dedicated pins.

13. The system of claim 12, wherein the plurality of defined pins further comprises second subset of pins to implement receive data lanes, and third subset of pins to implement transmit data lanes.

14. The system of claim 12, wherein the subset of the plurality of dedicated pins of the message interface are mapped to a plurality of registers, the plurality of registers are used to enable a plurality of different operations, and the plurality of different operations comprise recalibration of the PHY receiver.

15. The system of claim 11, wherein the defined interface is a PHY Interface for PCI Express (PIPE)-based interface.

16. The system of claim 11, wherein the MAC circuitry comprises a second register to store a second bit of data.

17. The system of claim 16, wherein the PHY circuitry is further arranged to send a completion message via the message bus interface to write a value to the second bit to identify completion of recalibration of the PHY receiver by the recalibration circuitry.

18. The system of claim 16, wherein the PHY circuitry is further arranged to send a PHY initiated recalibration request via the message bus interface to write a value to the second bit when the PHY circuitry determines a need for recalibration of the PHY receiver.

19. The system of claim 18, wherein the value of the bit is written based on the PHY initiated recalibration request.

* * * * *